(12) United States Patent
Pmsvvsv et al.

(10) Patent No.: US 11,271,406 B2
(45) Date of Patent: Mar. 8, 2022

(54) SELECTIVE GROUNDING OF GRID PARALLEL INVERTER SYSTEMS

(71) Applicant: BLOOM ENERGY CORPORATION, San Jose, CA (US)

(72) Inventors: Prasad Pmsvvsv, Sunnyvale, CA (US); Carl Cottuli, Franklin, MA (US); Beau Baker, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 555 days.

(21) Appl. No.: 16/250,153

(22) Filed: Jan. 17, 2019

(65) Prior Publication Data

US 2019/0229535 A1 Jul. 25, 2019

Related U.S. Application Data

(60) Provisional application No. 62/621,328, filed on Jan. 24, 2018.

(51) Int. Cl.
*H02J 3/38* (2006.01)
*H01M 8/04992* (2016.01)
*H02J 9/06* (2006.01)
*H02J 3/00* (2006.01)

(52) U.S. Cl.
CPC ......... *H02J 3/387* (2013.01); *H01M 8/04992* (2013.01); *H02J 3/383* (2013.01); *H02J 3/386* (2013.01); *H02J 9/06* (2013.01); *H01M 2250/10* (2013.01); *H02J 3/001* (2020.01)

(58) Field of Classification Search
CPC .. H02J 3/387; H02J 3/383; H02J 3/386; H02J 9/06; H02J 3/001; H01M 8/04992; H01M 2250/10

USPC .......................................................... 307/23
See application file for complete search history.

(56) References Cited

U.S. PATENT DOCUMENTS

| | | | |
|---|---|---|---|
| 9,106,098 B2 | 8/2015 | Srinivasan et al. | |
| 9,190,673 B2 | 11/2015 | Venkataraman et al. | |
| 9,337,690 B2 | 5/2016 | Navarro | |
| 10,396,662 B2* | 8/2019 | Lubomirsky | H02M 3/1563 |
| 2012/0178003 A1 | 7/2012 | Venkataraman et al. | |
| 2014/0117764 A1 | 5/2014 | Navarro | |
| 2015/0280607 A1* | 10/2015 | Wachenfeld | H02M 7/42 363/95 |

(Continued)

OTHER PUBLICATIONS

Bender—How it Works Knowledgebase, "Ground Fault Detection in Ungrounded AC/DC Systems," https://www.bender.org/knowledgebase/?a=ground-fault-detection-ungrounded-system, viewed on Jan. 15, 2018, 2 pages.

(Continued)

*Primary Examiner* — Hal Kaplan
*Assistant Examiner* — Swarna N Chowdhuri
(74) *Attorney, Agent, or Firm* — The Marbury Law Group PLLC

(57) ABSTRACT

A method of operating a power generator having a first electrical output electrically connected to a utility grid and a second electrical output electrically connected to a load includes detecting if the first electrical output of the power generator is electrically disconnected from the utility grid, and electrically connecting at least a neutral line of the first electrical output to ground in response to detecting that the first output is electrically disconnected from the utility grid.

11 Claims, 20 Drawing Sheets

(56) References Cited

U.S. PATENT DOCUMENTS

2019/0190274 A1* 6/2019 Fazeli .................. H02J 7/0029

OTHER PUBLICATIONS

Sprecher+Schuh—Literature, "How a Ground Fault Sensor Works," http://www.sprecherschuh.com/library/techdocs/posts/2012/07/cep7-ground-fault.html, viewed on Jan. 15, 2018, 2 pages.

Fischer, N. et al., "Methods for Detecting Ground Faults in Medium-Voltage Distribution Power Systems," White Paper, Copyright @ SEL 2006, pp. 1-19, (2006).

* cited by examiner

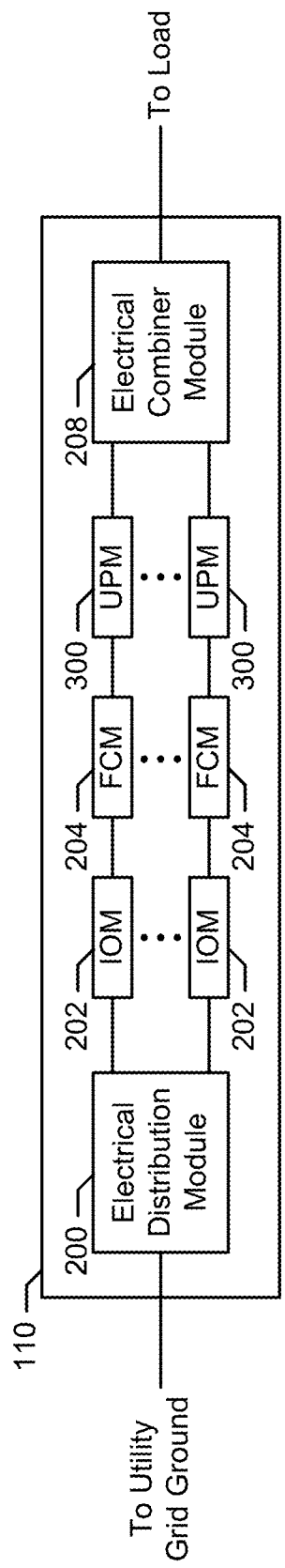
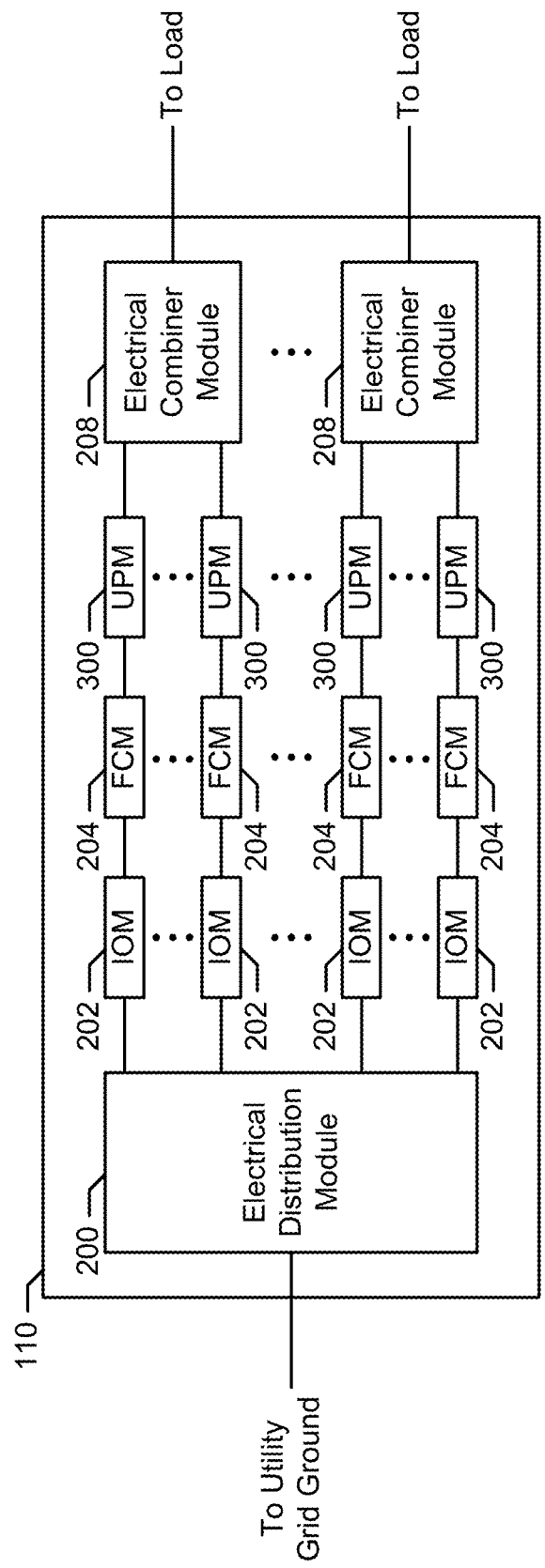
FIG. 3A
FIG. 3B

SELECTIVE GROUNDING OF GRID PARALLEL INVERTER SYSTEMS

The present disclosure is directed to power generator control systems and methods, such as to fuel cell electric power generator systems configured to provide electric power electrical loads in parallel with and separate from an electric grid.

BACKGROUND

Electrical power systems can be used to provide electrical power to one or more electrical loads such as buildings, appliances, lights, tools, air conditioners, heating units, factory equipment and machinery, power storage units, computers, security systems, etc. The electricity used to power an electrical load is often generated at a power station using fossil fuels, nuclear energy, hydro-electricity, etc. However, electricity may alternatively or additionally be generated using alternative power sources such as fuel cells, solar arrays, wind turbines, thermo-electric devices, batteries, etc.

Electrical power systems can include power generator and distributions systems operating in parallel to one another that can share or be tied to components of another power generator or distribution system (hereinafter "an electric grid parallel fuel cell electric power system"). Power events in one power generator or distribution system can trigger a reaction in another power generator or distribution system. Such reactions can create dangerous circumstances that need to be mitigated to avoid damage to the power generator or distribution system and to the electrical loads to which they provide electric power, and to avoid harm to people using or near the power generator or distribution system.

SUMMARY

The present disclosure may solve one or more of the above-mentioned problems and/or achieve one or more of the above-mentioned desirable features. Other features and/or advantages may become apparent from the description which follows.

An aspect of the present disclosure provides for a method of grounding an in-parallel converter system comprising a utility grid and one or more power generators including operably connecting neutral wires of the one or more electrical power generators to each other, providing an electrically controlled contactor or circuit breaker between the connected one or more electrical power generators and ground, detecting when input-output modules of the power generators of the in-parallel converter systems are disconnected from a source ground and disconnecting the power generators of the in-parallel converter systems from the utility grid and connecting the in-parallel converter systems to the ground with electrically controlled contactor or circuit breaker.

Another aspect of the present disclosure provides for an in-parallel converter system including a utility grid comprising a source ground, one or more power generators operable attached to the utility grid, a main contactor comprising an electrically controlled contactor or circuit breaker located between the utility grid and the one or more power generators, an auxiliary contactor comprising an electrically controlled contactor or circuit breaker located between the one or more electrical power generators and the ground.

BRIEF DESCRIPTION OF THE DRAWINGS

The accompanying drawings, which are incorporated herein and constitute a part of this specification, illustrate exemplary embodiments. Together with the general description given above and the detailed description given below, serve to explain the features of the various embodiments.

FIGS. 3A and 3B are block diagrams illustrating power generators of an electric grid parallel fuel cell electric power system according to embodiments of the present disclosure.

DETAILED DESCRIPTION

The various embodiments will be described in detail with reference to the accompanying drawings. Whenever possible, the same reference numbers will be used throughout the drawings to refer to the same or like parts. References made to particular examples, details, and representative materials, methods, and implementations are for illustrative purposes, and are not intended to limit the scope of the various embodiments of the claims.

Power generators of an electric grid parallel fuel cell electric power system capable of operating as an independent electric power source for a load will become an ungrounded source when its grid parallel inverter is disconnected from its ground point of an electric grid power source ground (typically an electric grid transformer of an electric utility service). An example of a power generator is a DC power generator, such as a fuel cell power generator of a fuel cell electric power system. However, other DC or AC power generators, such as solar panels, wind turbines, diesel generators, or power storages devices, such as batteries or capacitors, may be used instead of or in addition to fuel cell power generators. A neutral bus of the grid parallel inverter cannot be grounded as long as it is connected to the ground point of the electric grid power source, as the neutral bus can potentially drive neutral current to the electric grid transformer through a ground wire, which in turn can raise the ground potential. To improve safety from damage and harm to people, property and electric equipment of the electric grid parallel fuel cell electric power system and the electric grid, the present disclosure describes systems and methods for disconnecting a neutral bus of the electric grid parallel electric power system from the electric grid power source ground during grid events. Further, to improve safety from damage and harm, the present disclosure further describes systems and methods for connecting the neutral bus to a local ground in response to disconnecting from the electric grid power source ground.

Figure 1:
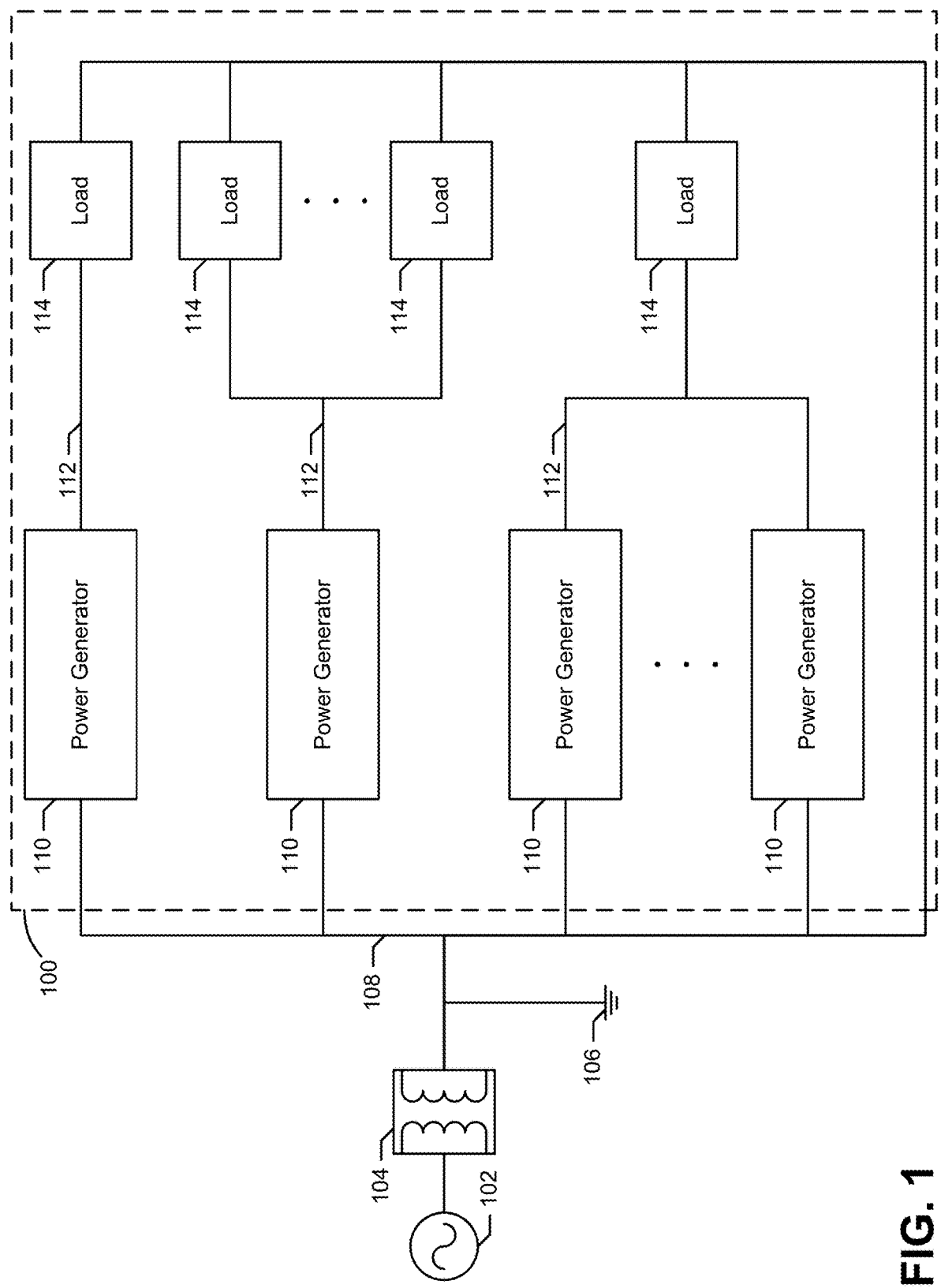
FIG. 1 is a block diagram illustrating an electric grid parallel fuel cell electric power system according to an embodiment of the present disclosure.

FIG. 1 illustrates an example electric grid parallel electric power system 100, which can be a fuel cell power system, (hereinafter "fuel cell system") according to an embodiment of the present disclosure. The fuel cell system 100 may be electrically connected to an alternating current (AC) electric grid power source 102 via an electric grid transformer 104 and an electric grid power bus 108. The alternating current electric grid power source 102, the electric grid transformer 104, and the fuel cell system 100 may be electrically connected to an electric grid power source ground 106 via the electric grid power bus 108. The electric grid power bus 108 may be a multi-wire power bus configured to transmit alternating current between the electric grid transformer 104 and the fuel cell system 100. For example, the electric grid power bus 108 may be a four-wire power bus configured to transmit a three-phase alternating current on three of the wires between the electric grid transformer 104 and the fuel cell system 100. The electric grid power bus 108 may also include a neutral wire electrically connected to the electric grid power source ground 106 between the electric grid transformer 104 and the fuel cell system 100. The electric grid power bus 108 may also be configured to transmit the three-phase alternating current to any number of loads 114.

The fuel cell system 100 may include any number of power generators 110. The electric grid power bus 108 may electrically connect the power generators 110 to the electric grid transformer 104 and to the electric grid power source ground 106. The fuel cell system 100 may include a fuel cell system power bus 112. The fuel cell system power bus 112 may be a multi-wire power bus configured to transmit alternating current and/or direct current (DC) between any number of any number of power generators 110 and any number of loads 114. For example, the fuel cell system power bus 112 may be a four-wire power bus configured to transmit a three-phase alternating current on three of the wires between any number of any number of power generators 110 and any number of loads 114. In various embodiments the number relationships between the power generators 110 and the loads 114 may include one power generator 110 to one load 114, one power generator 110 to multiple loads 114, and/or multiple power generators to multiple loads. Alternatively, the power generators 110 may be configured to distribute and/or convert electric power received from the alternating current electric grid power source 102, via the electric grid transformer 104 and the electric grid power bus 108. The power generators 110 may be configured to generate direct current electric power, and distribute and/or convert the generated electric power. The power generators 110 may be configured to distribute the received, converted, and/or generated electric power to any number of loads 114 via the fuel cell system power bus 112. In some embodiments, the power generators 110 may be configured to distribute the received and/or the converted received electric power, and distribute the generated and/or the converted generated electric power, distributing the various types of received and generated electric power separately or in combination. For example, the power generators 110 may distribute the received and/or the converted received electric power while not distributing the generated and/or the converted generated electric power based on, for example, sufficient received electric power from the alternating current electric grid power source 102 to satisfy the loads 114, and/or based on a cost analysis of using the received electric power versus the generated electric power. The power generators 110 may be configured to not distribute the received and/or the converted received electric power while distributing the generated and/or the converted generated electric power based on, for example, the electric power from the alternating current electric grid power source 102 being unavailable, and/or based on a cost analysis of using the received electric power versus the generated electric power. The power generators 110 may distribute the received and/or the converted received electric power while distributing the generated and/or the converted generated electric power based on, for example, insufficient received and/or generated electric power to satisfy the loads 114, and/or based on a cost analysis of using mixes of the received electric power and the generated electric power. Power generators 110, including their components, are described further herein with reference to FIGS. 2A-12, the descriptions of which are incorporated into the example illustrated in FIG. 1.

An embodiment is drawn to a method of operating a power generator 110 having a first electrical output electrically connected to a utility grid 112 and a second electrical output electrically connected to a load 114. The method includes detecting if the first electrical output of the power generator is electrically disconnected from the utility grid and electrically connecting at least a neutral line of the first electrical output to ground in response to detecting that the first output is electrically disconnected from the utility grid. In an embodiment, the power generator 110 comprises a direct current (DC) power generator. In an embodiment, the power generator 110 comprises a fuel cell power generator. In an embodiment, the first electrical output of the power generator 110 comprises a four line power bus 112 which provides three phase alternating electric current on three of the lines and the fourth line comprises the neutral line.

Detecting if the first electrical output of the power generator is electrically disconnected from the utility grid may be performed by any conventional ground fault detection technique and may be performed by measuring the current or voltage with current or voltage circuits. Conventional ground fault detection techniques are described in Normann Fischer, et. al., "Methods For Detecting Ground Faults In Medium-Voltage Distribution Power Systems," White Paper, Schweitzer, Engineering Laboratories, Inc., hereby incorporated by reference in its entirety. Conventional ground fault detection techniques include, but are not limited to, isolated neutral, sold grounding—unigrounding, solid grounding—multigrounding, low impedance grounding and resonant grounding. These techniques may include the use of a current polarized directional element, a negative-sequence voltage-polarized directional element, a zero-sequence voltage-polarized directional element, a high-impedance fault (HIF) detection element, a residual overcurrentl counting element and/or a sum of difference current (SDI) HIF detection element.

Figure 2A:
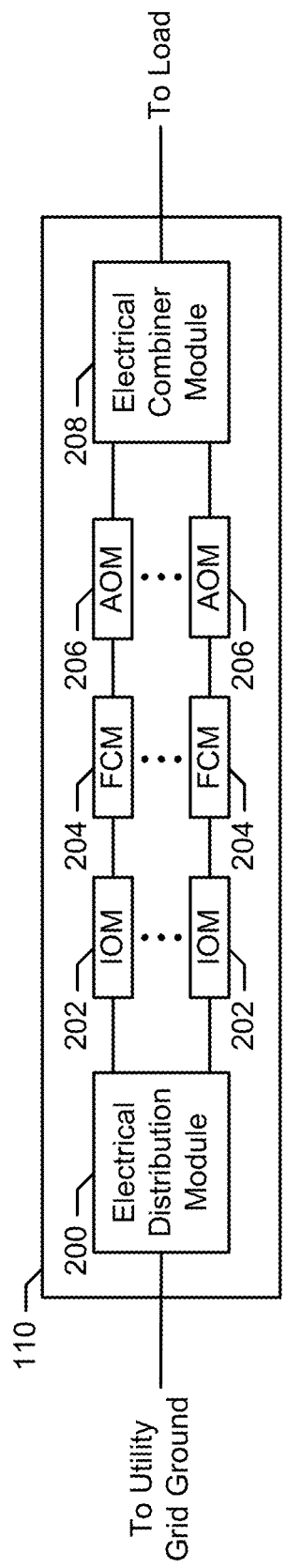
FIGS. 2A and 2B are block diagrams illustrating power generators of an electric grid parallel fuel cell electric power system according to embodiments of the present disclosure.
Figure 2B:
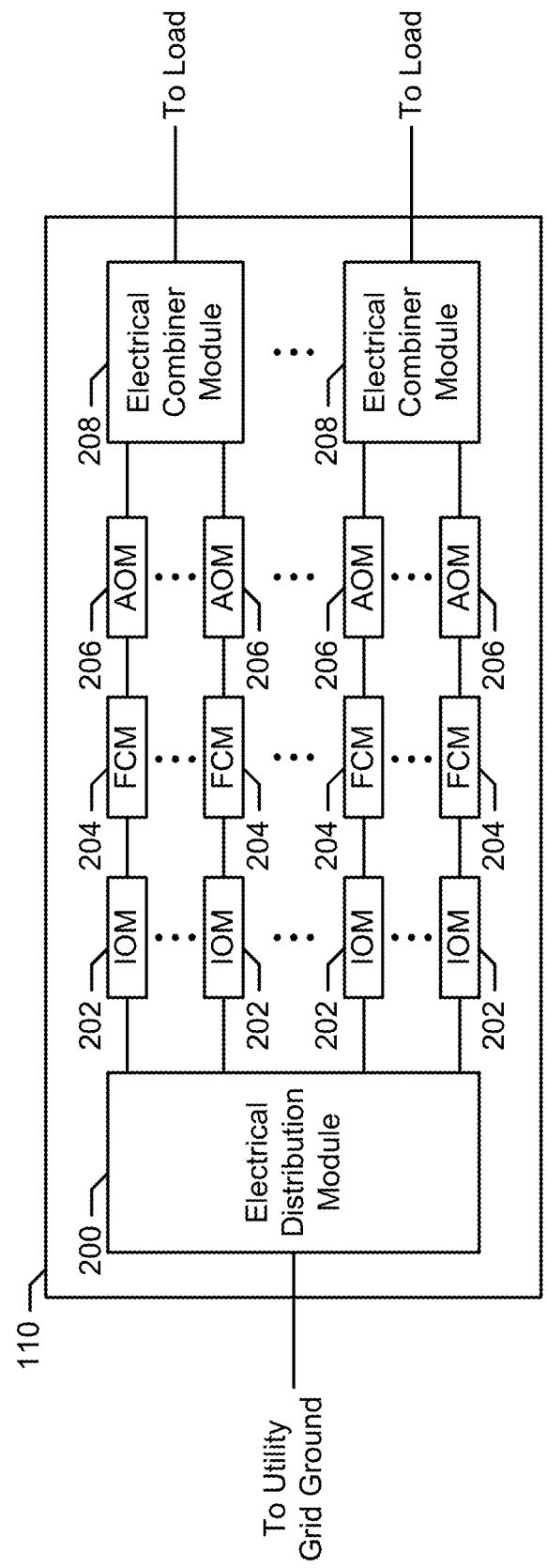

FIGS. 2A and 2B illustrate example power generators 110 of a fuel cell system (e.g., fuel cell system 100 in FIG. 1) according to embodiments of the present disclosure. An power generator 110 may include any number of electrical distribution modules 200, any number of input/output modules 202 (IOM), any number of power modules 204, such as fuel cell modules (FCM), any number of auxiliary output modules 206 (AOM), and any number of electrical combiner modules 208. Each of the modules 200, 202, 204, 206, 208 may be electrically connected by an power generator power bus, similar to the electric grid power bus 108 and the fuel cell system power bus 112 described herein with reference to FIG. 1.

An electrical distribution module 200 may receive alternating current electric power from the alternating current electric grid power source 102, via the electric grid transformer 104 and the electric grid power bus 108. The electrical distribution module 200 may distribute the received alternating current electric power from the alternating current electric grid power source 102 to any number of input/output modules 202. The electrical distribution module 200 may receive alternating current electric power from any number of input/output modules 202. The electrical distribution module 200 may distribute the received alternating current electric power from any number of input/output modules 202 to the electric grid transformer 104 via the electric grid power bus 108. Electrical distribution modules 200, including their components, are described further herein with reference to FIGS. 5A-5F and 13A-13E, the descriptions of which are incorporated into the examples illustrated in FIGS. 2A and 2B.

An input/output module 202 may receive alternating current electric power from the alternating current electric grid power source 102 via the electrical distribution module 200. The input/output module 202 may convert the received alternating current electric power to direct current electric power. In some embodiments, the input/output module 202 may step up and/or step down the amperage of the input alternating current electric power and/or the output direct current electric power. The input/output module 202 may provide the direct current electric power to a fuel cell module 204.

The input/output module 202 may receive direct current electric power from and generated by the fuel cell module 204. The input/output module 202 may convert the received direct current electric power to alternating current electric power. In some embodiments, the input/output module 202 may step up and/or step down the amperage of the input direct current electric power and/or the output alternating current electric power. The input/output module 202 may provide the alternating current electric power to the electric grid transformer 104 via the electrical distribution module 200. Input/output modules 202, including their components, are described further herein with reference to FIGS. 7A-7L, 10, and 11A-11E, the descriptions of which are incorporated into the examples illustrated in FIGS. 2A and 2B.

A fuel cell module 204 may receive direct current electric power from an input/output module 202, generate direct current electric power, and/or distribute received and/or generated direct current electric power. For example, the fuel cell module 204 may distribute the received direct current electric power while not generating direct current electric power based on, for example, sufficient received direct current electric power from the input/output module 202 to satisfy the loads 114, and/or based on a cost analysis of using the received direct current electric power versus the generated direct current electric power. The fuel cell module 204 may be configured to not distribute the received direct current electric power while generating direct current electric power and distributing the generated direct current electric power based on, for example, the electric power from the alternating current electric grid power source 102 being unavailable, and/or based on a cost analysis of using the received direct current electric power versus the generated direct current electric power. The fuel cell module 204 may distribute the received direct current electric power while generating direct current electric power and distributing the generated direct current electric power based on, for example, insufficient received and/or generated direct current electric power to satisfy the loads 114, and/or based on a cost analysis of using mixes of the received and the generated direct current electric power. The fuel cell modules 204, including their components, are described further herein with reference to the fuel cell system 1400 in FIG. 12, the descriptions of which are incorporated into the example illustrated in FIGS. 2A and 2B. Alternatively, the power module 204 can be solar panels, wind turbines, batteries, capacitors, diesel generators, solar thermal power generators, etc.

An auxiliary output module 206 may receive direct current electric power distributed from and generated by a fuel cell module 204. In some embodiments, the auxiliary output module 206 may step up and/or step down the amperage of the input direct current electric power and/or the output direct current electric power. The auxiliary output module 206 may provide the direct current electric power to an electrical combiner module 208. Auxiliary output modules 206, including their components, are described further herein with reference to FIG. 9, the description of which is incorporated into the examples illustrated in FIGS. 2A and 2B.

An electrical combiner module 208 may receive direct current electric power from any number of auxiliary output modules 206. The electrical combiner module 208 may combine all and/or portions of the received direct current electric power. The electrical combiner module 208 may distribute the combined direct current electric powers to any number of loads 114 via the fuel cell system power bus 112. Electrical combiner modules 208, including their components, are described further herein with reference to FIGS. 6A-6B, the descriptions of which are incorporated into the examples illustrated in FIGS. 2A and 2B.

In some embodiments, any number of sets of input/output modules 202, fuel cell modules 204, and auxiliary output modules 206 may be electrically connected between an electrical distribution module 200 and electrical combiner module 208. In some embodiments, any number of sets of input/output modules 202, fuel cell modules 204, and auxiliary output modules 206 may be electrically connected between an electrical distribution module 200 and any number of electrical combiner modules 208.

FIGS. 3A and 3B illustrate alternative power generators of an electric grid parallel fuel cell electric power system (e.g., fuel cell system 100 in FIG. 1) according to embodiments of the present disclosure. An power generator 110 may include any number of electrical distribution modules 200, any number of input/output modules 202 (IOM), any number of fuel cell modules 204 (FCM), any number of uninterruptable power modules 300 (UPM), and any number of electrical combiner modules 208. Each of the modules 200, 202, 204, 208, 300 may be electrically connected by an power generator power bus, similar to the electric grid power bus 108 and the fuel cell system power bus 112 described herein with reference to FIG. 1. The electrical distribution modules 200, input/output modules 202, and fuel cell modules 204 are as described herein with reference to FIGS. 2A and 2B. Electrical distribution modules 200, input/output modules 202, and fuel cell modules 204, including their components, are described further herein with reference to FIGS. 5A-5F, 7A-7L and 11A-12, the descriptions of which are incorporated into the examples illustrated in FIGS. 3A and 3B.

An uninterruptable power module 300 may receive direct current electric power distributed from and generated by a fuel cell module 204. The uninterruptable power module 300 may convert the received direct current electric power to alternating current electric power. In some embodiments, the uninterruptable power module 300 may step up and/or step down the amperage of the input direct current electric power and/or the output alternating current electric power. The uninterruptable power module 300 may provide the alternating current electric power to an electrical combiner module 208. Uninterruptable power modules 300, including their components, are described further herein with reference to FIG. 8, the description of which is incorporated into the examples illustrated in FIGS. 3A and 3B.

An electrical combiner module 208 may receive alternating current electric power from any number of uninterruptable power modules 300. The electrical combiner module 208 may combine all and/or portions of the received alternating current electric power. The electrical combiner module 208 may distribute the combined alternating current electric powers to any number of loads 114 via the fuel cell system power bus 112. Electrical combiner modules 208, including their components, are described further herein with reference to FIGS. 6A-6B, the descriptions of which are incorporated into the examples illustrated in FIGS. 3A and 3B.

In some embodiments, any number of sets of input/output modules 202, fuel cell modules 204, and uninterruptable power modules 300 may be electrically connected between an electrical distribution module 200 and electrical combiner module 208. In some embodiments, any number of sets of input/output modules 202, fuel cell modules 204, and uninterruptable power modules 300 may be electrically connected between an electrical distribution module 200 and any number of electrical combiner modules 208.

Figure 4:
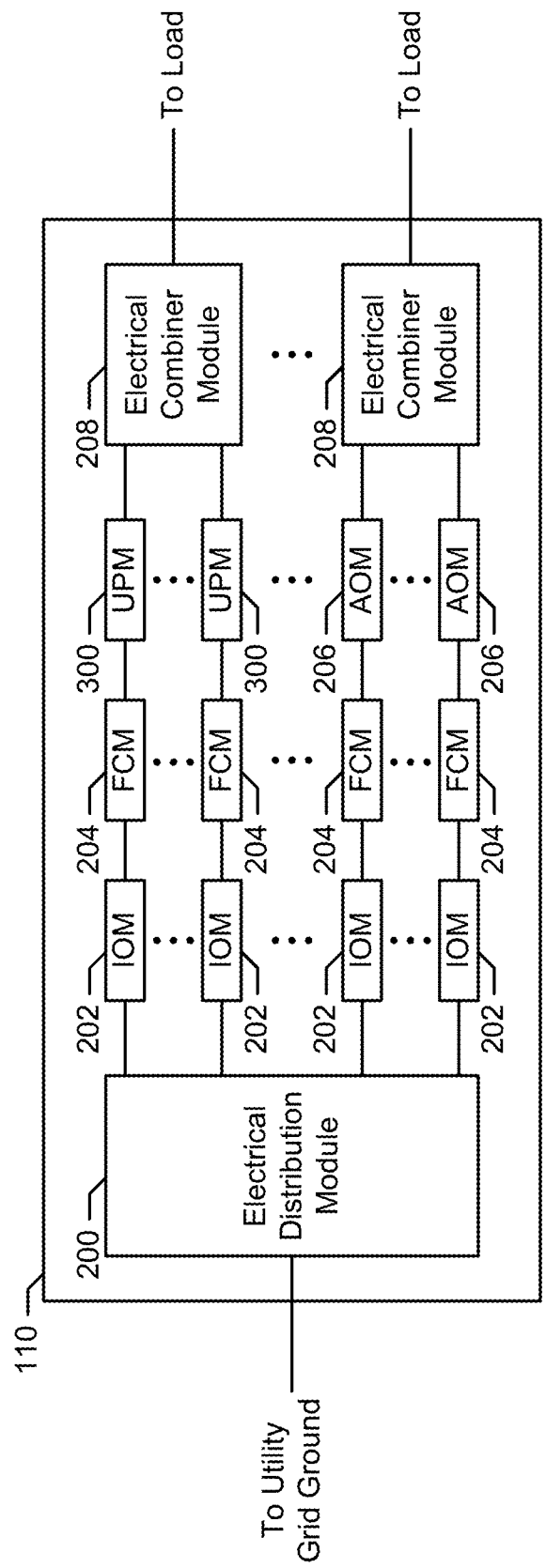
FIG. 4 is a block diagram illustrating an power generator of an electric grid parallel fuel cell electric power system according to an embodiment of the present disclosure.

FIG. 4 illustrates an example power generator of an electric grid parallel fuel cell electric power system (e.g., fuel cell system 100 in FIG. 1) according to an embodiment of the present disclosure. An power generator 110 may include any number of electrical distribution modules 200, any number of input/output modules 202 (IOM), any number of fuel cell modules 204 (FCM), any number of auxiliary output modules 206 (AOM), any number of uninterruptable power modules 300 (UPM), and any number of electrical combiner modules 208. Each of the modules 200, 202, 204, 206, 208, 300 may be electrically connected by an power generator power bus, similar to the electric grid power bus 108 and the fuel cell system power bus 112 described herein with reference to FIG. 1. The electrical distribution modules 200, input/output modules 202, fuel cell modules 204, auxiliary output modules 206, uninterruptable power modules 300, and electrical combiner modules 208 are as described herein with reference to FIGS. 2A-3B. Electrical distribution modules 200, input/output modules 202, and fuel cell modules 204, auxiliary output modules 206, uninterruptable power modules 300, and electrical combiner modules 208 including their components, are described further herein with reference to FIGS. 5A-12, the descriptions of which are incorporated into the example illustrated in FIG. 4.

In some embodiments, any number of sets of input/output modules 202, fuel cell modules 204, and auxiliary output modules 206 may be electrically connected between an electrical distribution module 200 and electrical combiner module 208. Further, any number of sets of input/output modules 202, fuel cell modules 204, and uninterruptable power modules 300 may be electrically connected between the electrical distribution module 200 and electrical combiner module 208. In some embodiments, any number of sets of input/output modules 202, fuel cell modules 204, and auxiliary output modules 206 may be electrically connected between an electrical distribution module 200 and any number of electrical combiner modules 208. Further, any number of sets of input/output modules 202, fuel cell modules 204, and uninterruptable power modules 300 may be electrically connected between an electrical distribution module 200 and electrical combiner module 208. In some embodiments, any number of sets of input/output modules 202, fuel cell modules 204, and uninterruptable power modules 300 may be electrically connected between the electrical distribution module 200 and any number of electrical combiner modules 208.

FIGS. 5A-5F illustrate example electrical distribution modules 200 (EDM) of an electric grid parallel fuel cell electric power system (e.g., fuel cell system 100 in FIG. 1) according to embodiments of the present disclosure. For clarity and ease of explanation, the examples illustrated in FIGS. 5A-5F and described herein are described in terms of a neutral wire of an electrical distribution module 202 (hereinafter "electrical distribution module neutral wire") that may be electrically connected to a neutral wire of an electric grid power bus 108 (hereinafter "electric grid power bus neutral wire") and neutral wires of an power generator power bus (hereinafter "power generator power bus neutral wire(s)". An electrical distribution module neutral wire may be electrically connected to the electric grid power source ground 106 via an electric grid power bus neutral wire. The electrical distribution module neutral wire may electrically connect any number of input/output modules 202 in parallel via any number of power generator power bus neutral wires. The electrical distribution module 202 may include any number of automatic and/or controllable electrical switches 500, 502. For example, the electrical distribution module 200 may include any number of electrical contactors (e.g. relays), circuit breakers, fuses, and/or solid state switches. The automatic and/or controllable electrical switches 500, 502 may be configured to connect and disconnect portions of the electrical distribution module neutral wire to connect and disconnect any number of the input/output modules 202 and the electric grid power source ground 106. The automatic and/or controllable electrical switches 500, 502 may be configured to normally connect the input/output modules 202 and the electric grid power source ground 106. The automatic and/or controllable electrical switches 500, 502 may be configured to disconnect the input/output modules 202 and the electric grid power source ground 106 in response to any number of grid events. Examples of grid events may include a grid power outage or receiving alternating current power from the electric grid power source 102 that exceeds an upper threshold (i.e., power spike). In some embodiments, a single automatic and/or controllable electrical switch 500, 502 may connect and/or disconnect all of the input/output modules 202 and the electric grid power source ground 106, for example, automatic switches 500

Figure 5A:
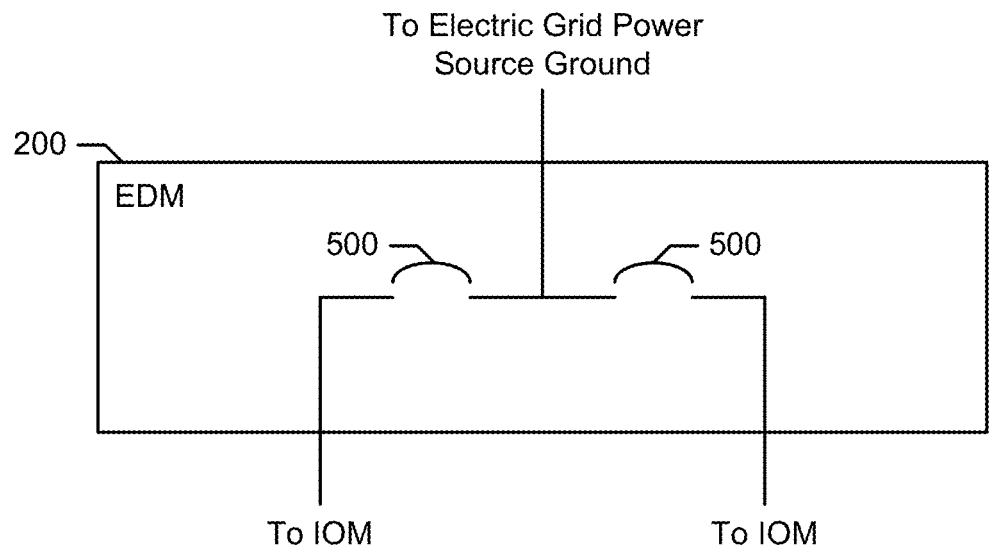
FIGS. 5A-5F are block diagrams illustrating electrical distribution modules of an electric grid parallel fuel cell electric power system according to embodiments of the present disclosure.

(e.g., circuit breakers) can be used as shown in FIG. 5A. In some embodiments, multiple automatic and/or controllable electrical switches 500, 502 may connect and/or disconnect any number of the input/output modules 202 and the electric grid power source ground 106.

In some embodiments, such as the examples illustrated in FIGS. 5B-5F, the electrical distribution module neutral wire may electrically connect any number of local grounds 504 and any number of input/output modules 202 via any number of power generator power bus neutral wires. In some embodiments, a local ground 504 may include a ground for a site at which the fuel cell system 100 is located and/or a ground for the power generator 110. In some embodiments, any number of input/output modules 202 may connect to the same local ground 504. In some embodiments, such as the examples illustrated in FIGS. 5B, 5E, and 5F, the automatic and/or controllable electrical switches 502 may be further configured to connect and disconnect portions of the electrical distribution module neutral wire, and/or the electrical distribution module neutral wire and any number of power generator power bus neutral wires, to connect and disconnect any number of the input/output modules 202 and any number of local grounds 504. Grid events may cause the automatic and/or controllable electrical switches 502 to disconnect the input/output modules 202 and the electric grid power source ground 106, and connect the input/output modules 202 and the local grounds 504. In some embodiments, the automatic and/or controllable electrical switches 502 may be configured to operate in response to automatic and/or controllable electrical switches 500 disconnecting the electric grid power source ground 106. For example an electrical switch controller (not shown) may be configured to read an auxiliary contact of any of the automatic and/or controllable electrical switches 500, 502 and cause any number of controllable electrical switches 502 to connect the electrical distribution modules 200 to the local grounds 504. For example, the electrical switch controller may cause the connection in response to a reading below a lower threshold for the auxiliary contactor of automatic and/or controllable electrical switches 500 and/or a reading above an upper threshold for the auxiliary contactor of controllable electrical switches 502. For example, a grid outage causes the circuit breakers 500 to open automatically, then the contactors (e.g. relays) 502 are controlled to ground the electrical distribution modules 200 to local ground 504. For further example, if the electrical switch controller may cause the connection by using power line communication in response to sending a signal on the power generator bus from an electrical distribution module 200 or an input/output module 202 and receiving the signal in the other of the electrical distribution module 200 or an input/output module 202. For further example, the electrical switch controller may cause the connection in response to measuring resistance between the electric grid power bus 108 and an input/output module 202 exceeding a resistance threshold.

Figure 5B:
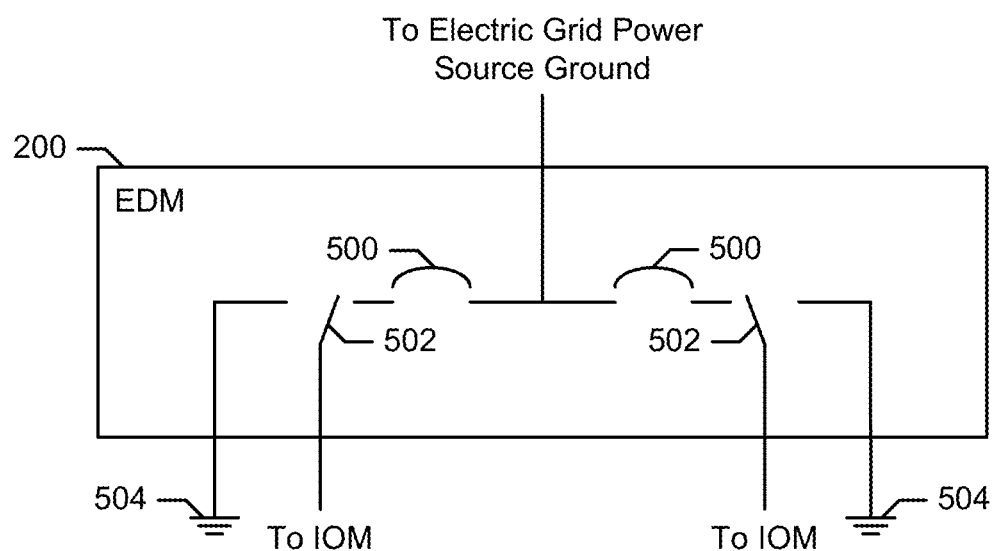
Figure 5C:
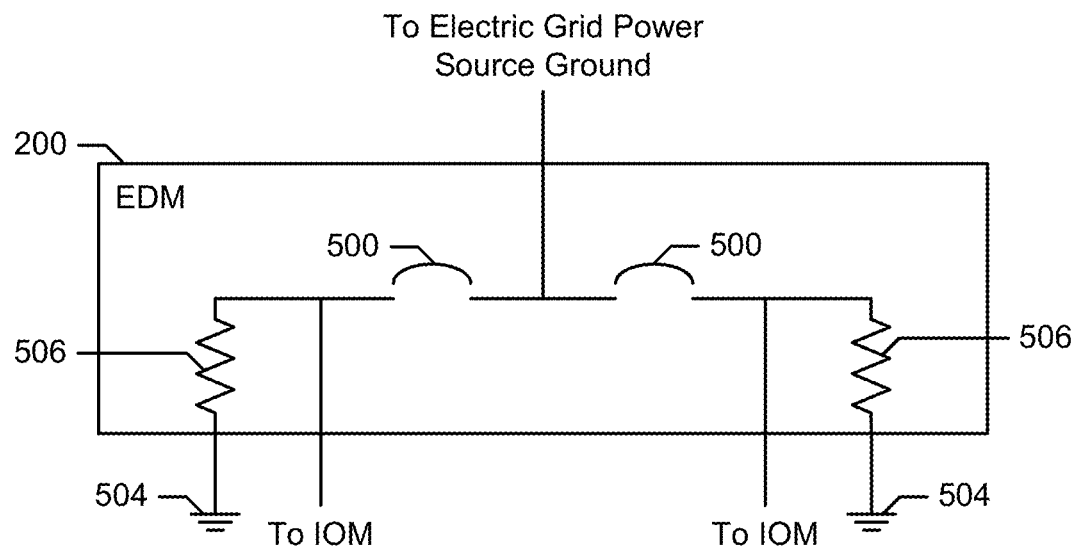
Figure 5D:
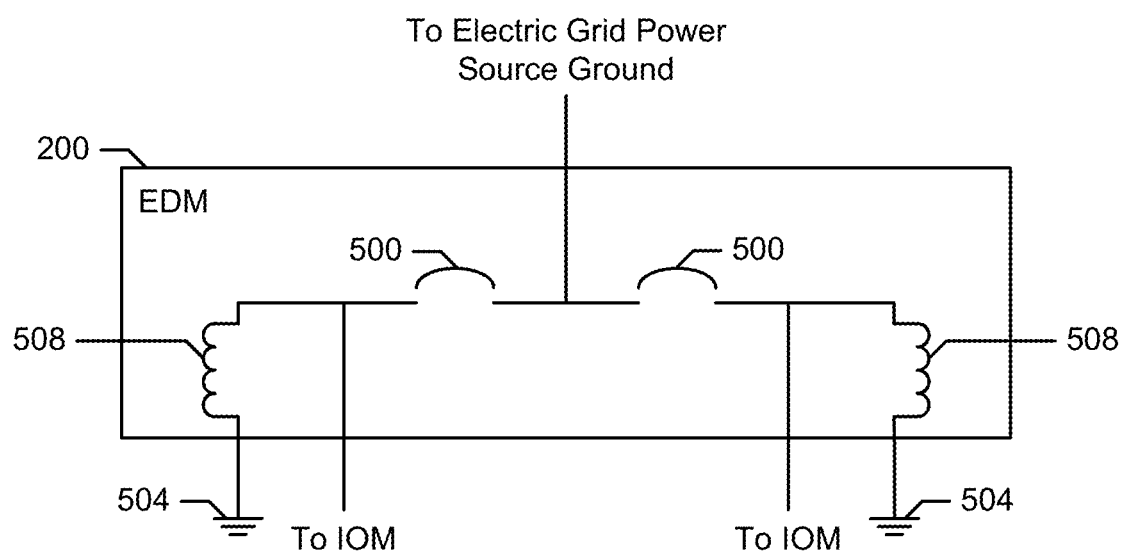
Figure 5E:
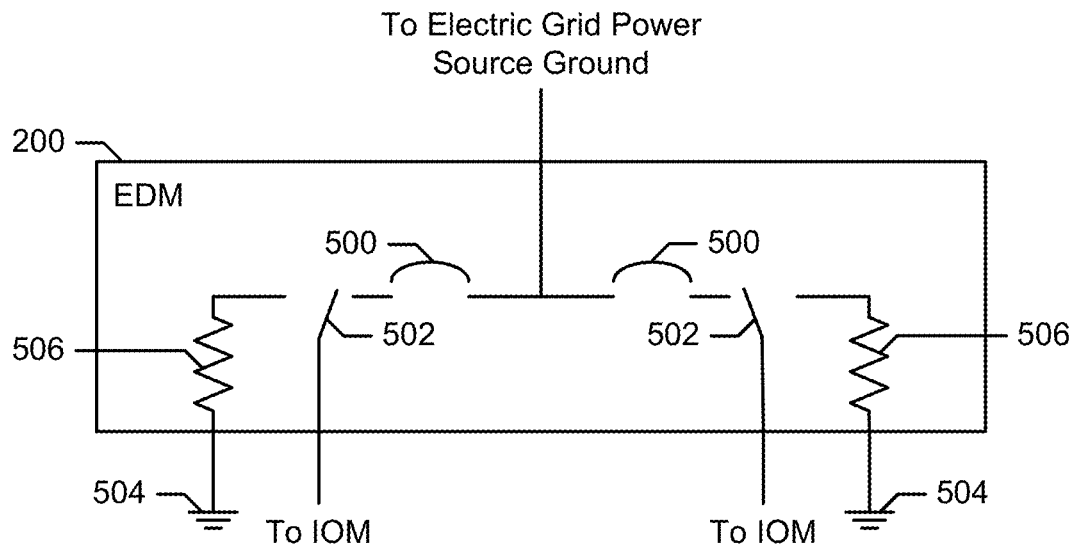
Figure 5F:
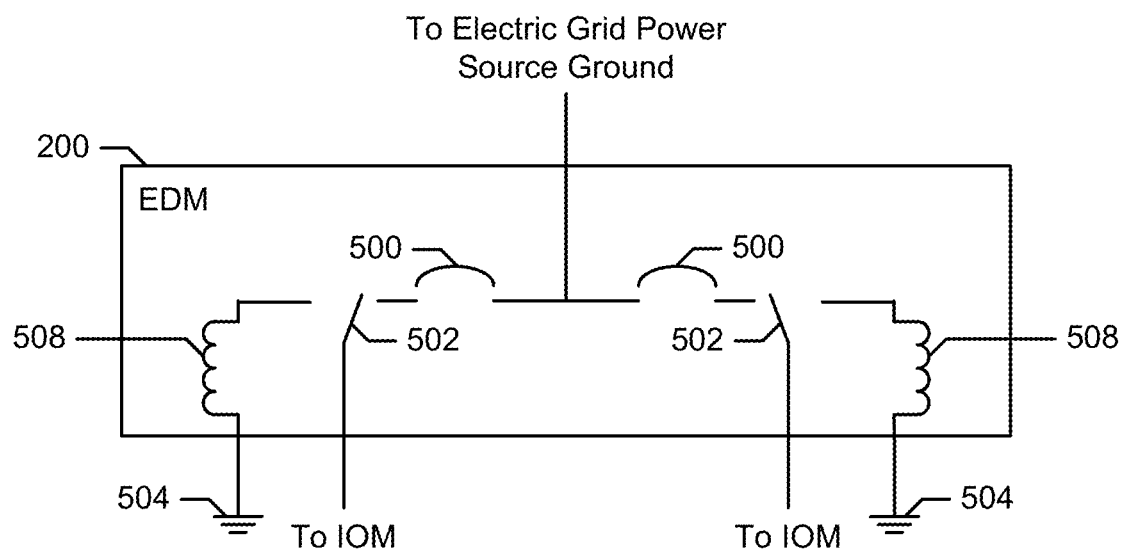

In some embodiments, such as the examples illustrated in FIGS. 5B, 5E, and 5F, the automatic and/or controllable electrical switches 502 may be further configured to connect and disconnect portions of the electric grid power bus neutral wire, and/or the electric grid power bus neutral wire and any number of power generator power bus neutral wires, to connect and disconnect any number of the input/output modules 202 and any number of local grounds 504. Grid events may cause the automatic and/or controllable electrical switches 502 to disconnect the input/output modules 202 and the electric grid power source ground 106, and connect the input/output modules 202 and the local grounds 504.

In some embodiments, such as the examples illustrated in FIGS. 5C-5F, the electrical distribution module neutral wire may include any number of resistors 506 and/or inductors 508, which may be configured to limit the neutral fault current to any number of local grounds 504 when the input/output modules 202 and the electric grid power source ground 106 are disconnected.

Figure 6A:
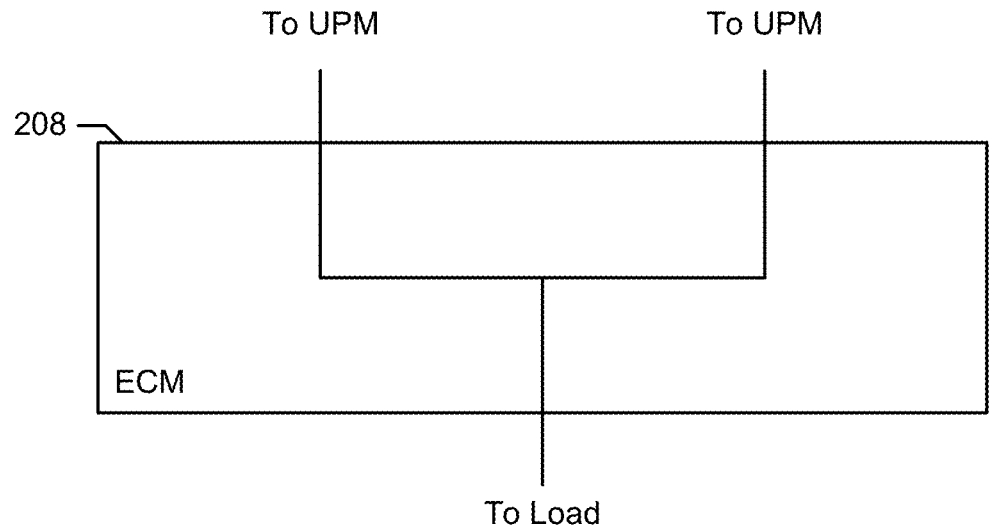
FIGS. 6A-6B are block diagrams illustrating electrical combiner modules of an electric grid parallel fuel cell electric power system according to embodiments of the present disclosure.
Figure 6B:
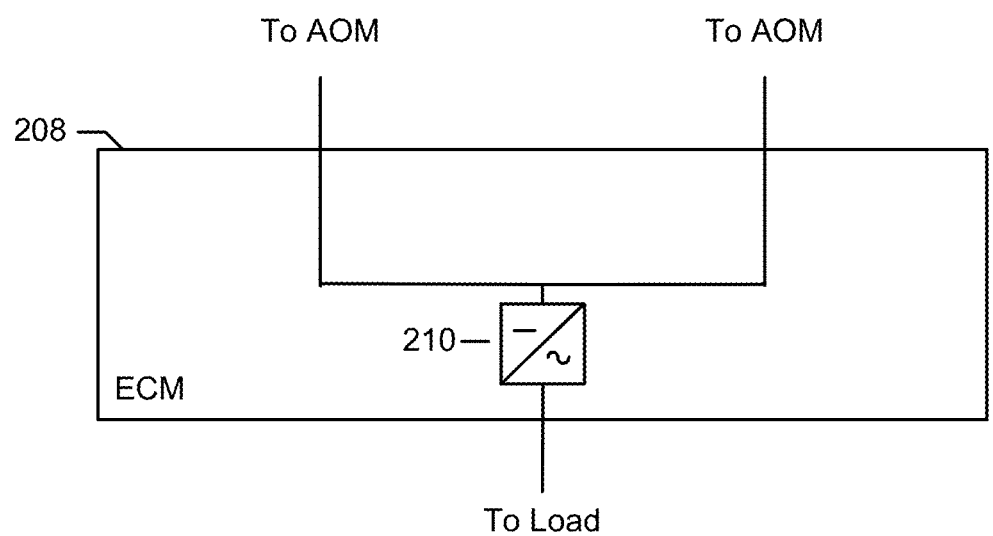
Figure 7A:
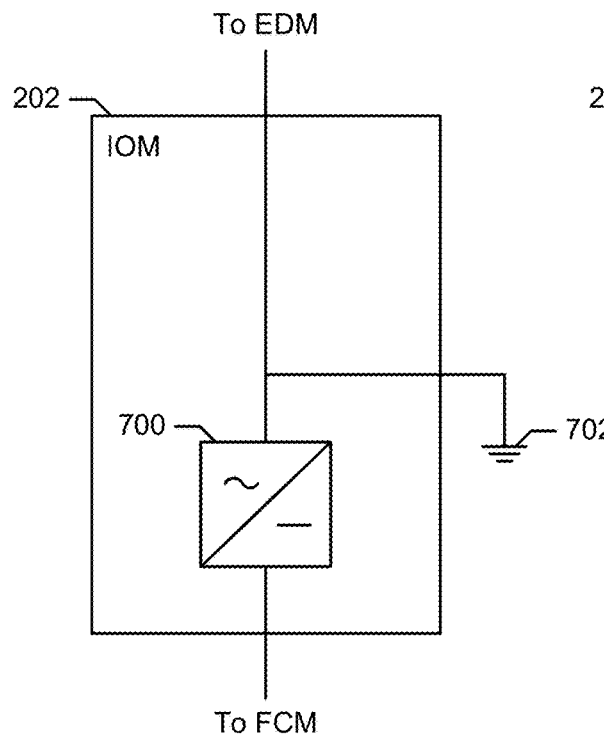
FIGS. 7A-7L are block diagrams illustrating input/output modules of an electric grid parallel fuel cell electric power system according to embodiments of the present disclosure.
Figure 7B:
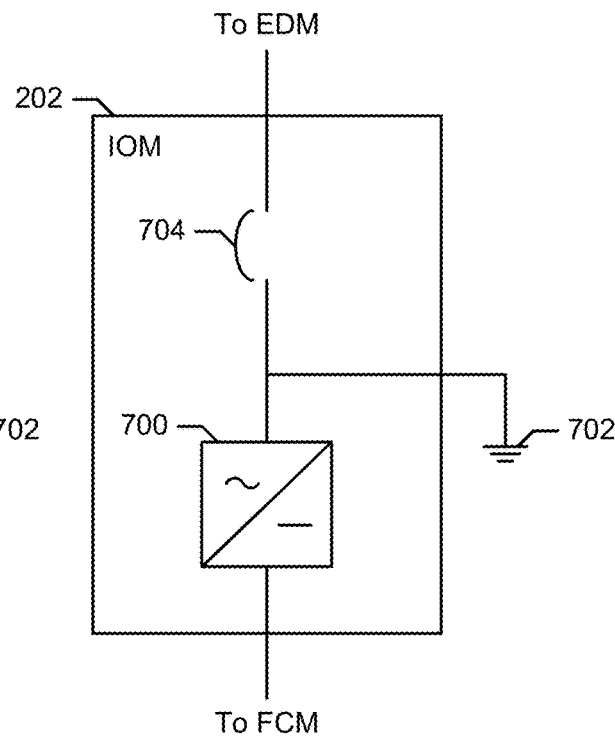
Figure 7C:
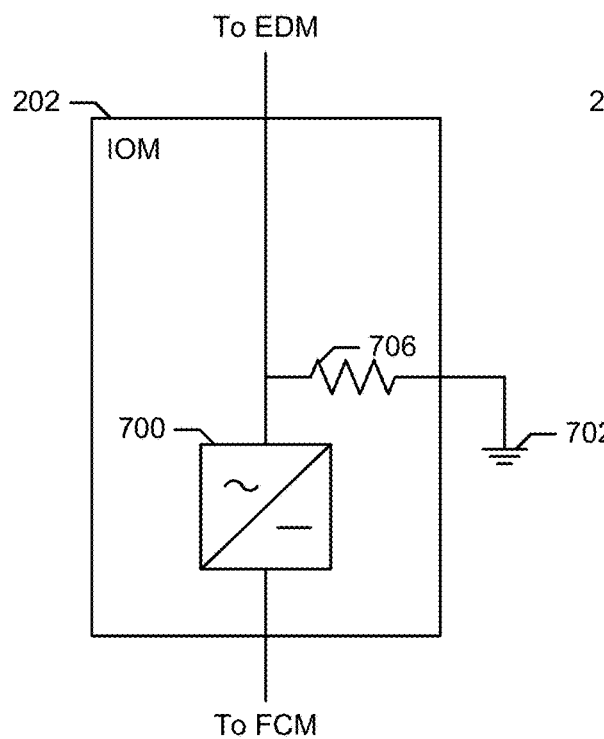
Figure 7D:
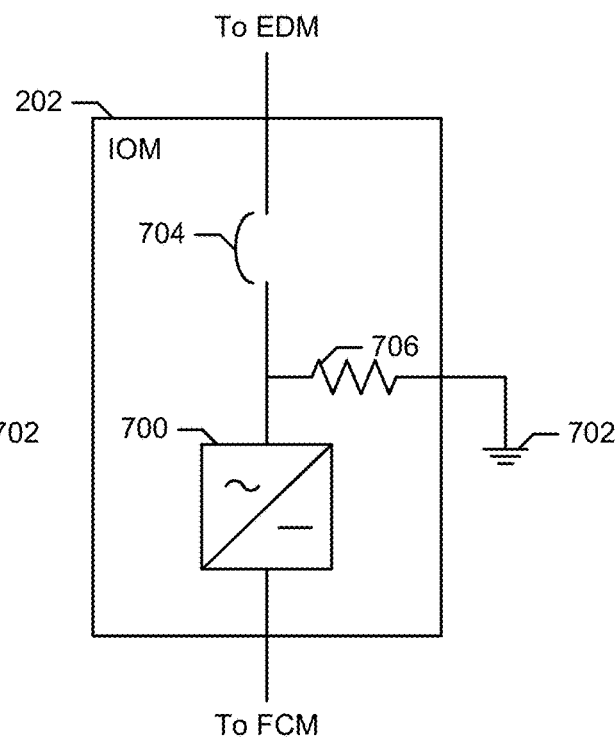
Figure 7E:
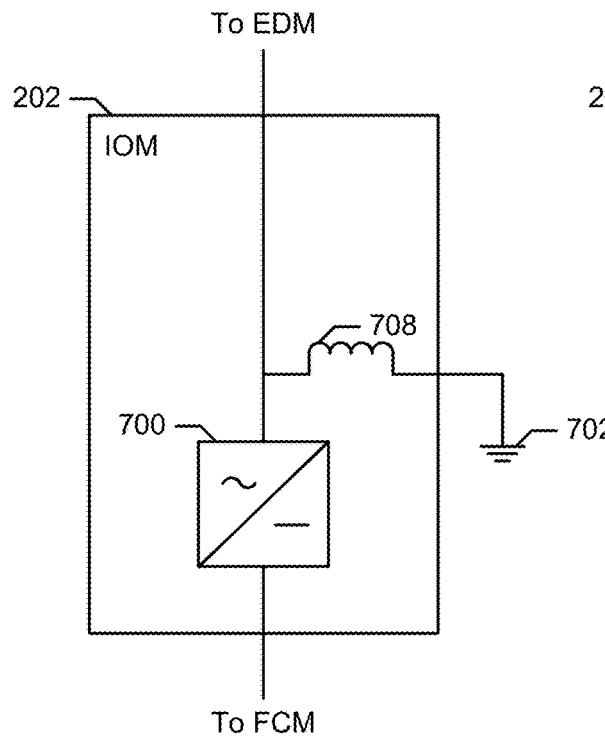
Figure 7F:
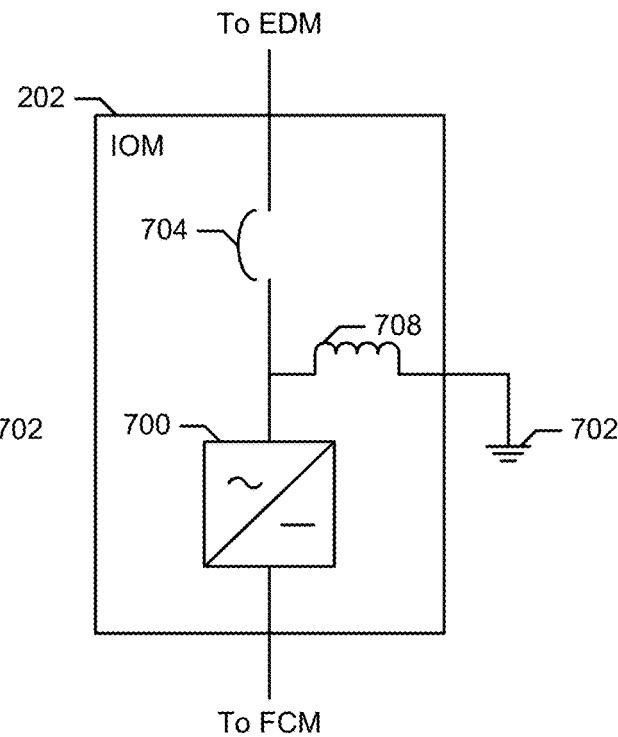
Figure 7G:
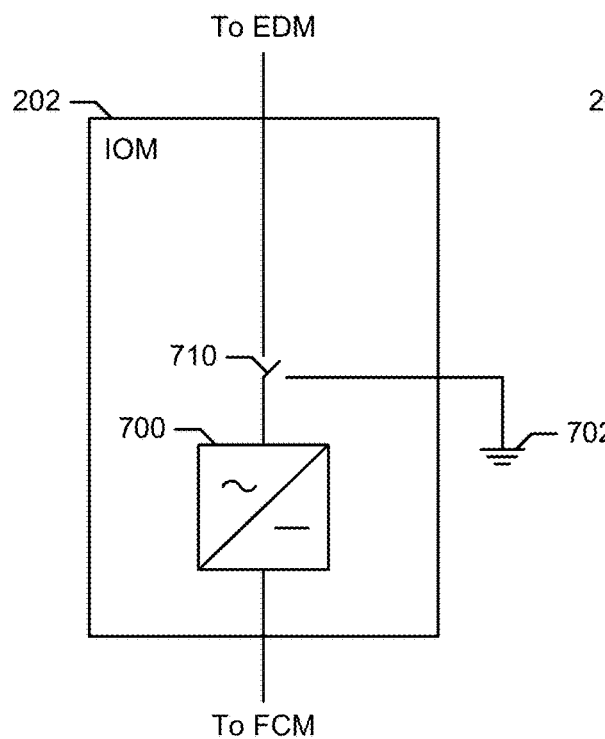
Figure 7H:
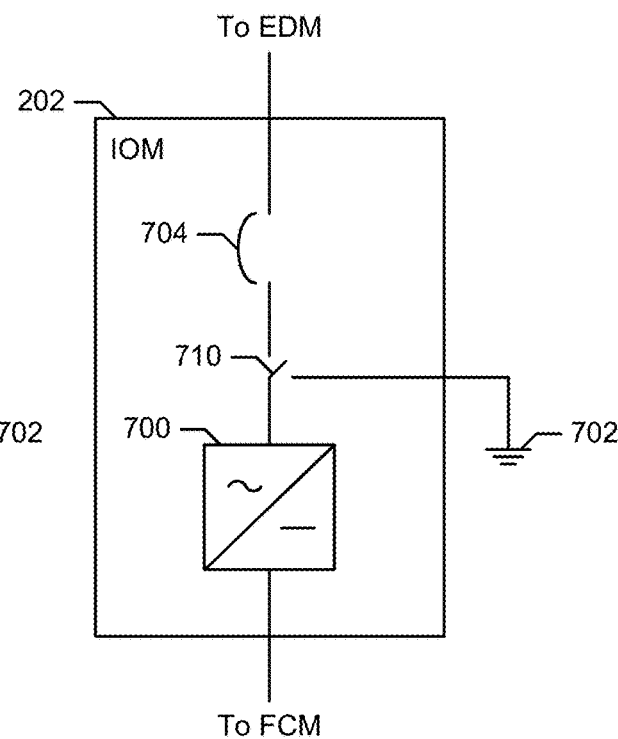
Figure 7I:
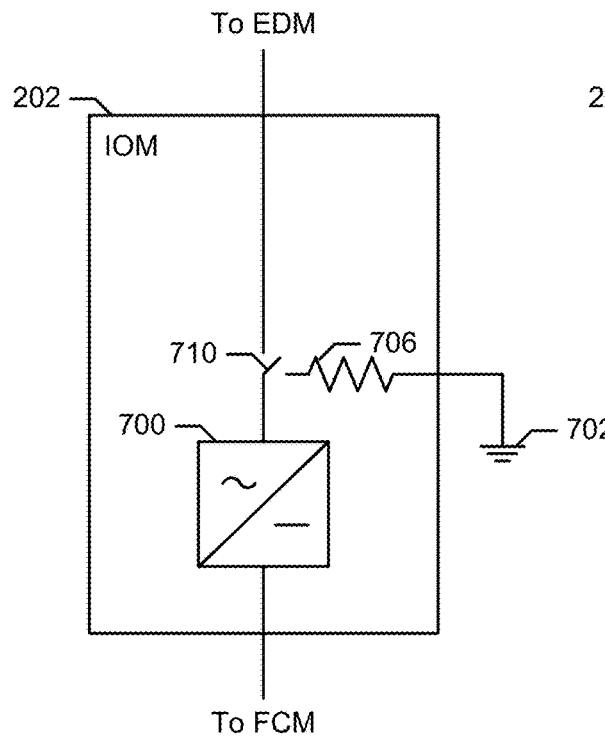
Figure 7J:
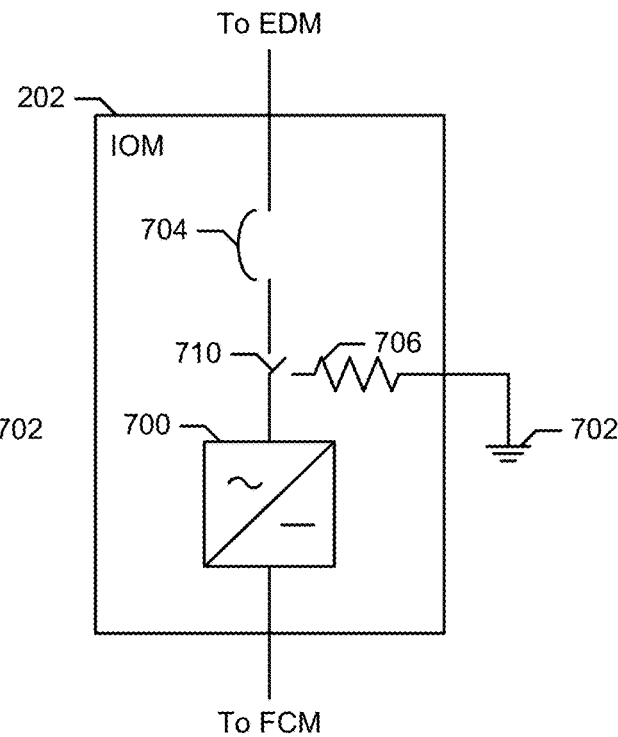
Figure 7K:
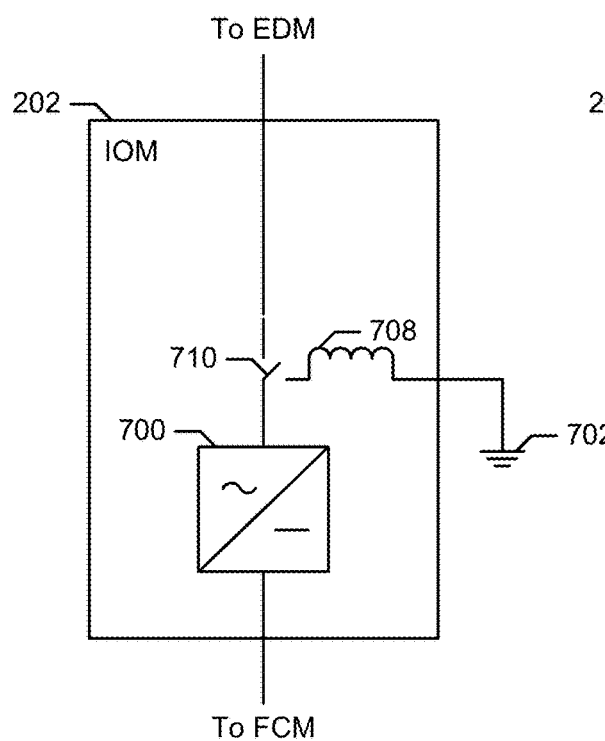
Figure 7L:
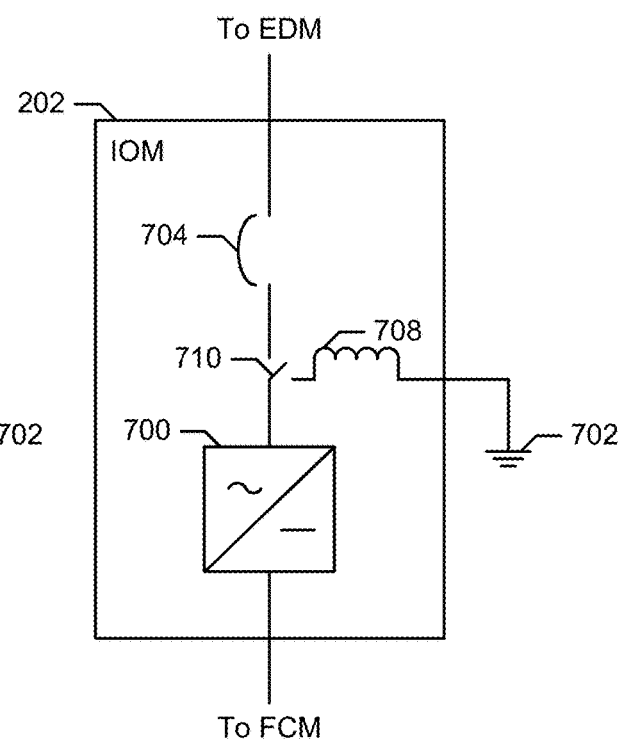

FIGS. 6A-6B are block diagrams illustrating electrical combiner modules 208 of an electric grid parallel fuel cell electric power system according to embodiments of the present disclosure. The electrical combiner module 208 illustrated in FIG. 6A receives alternating current from the UPMs 300 and combines the current. The combined alternating current is then provided to the load. The electrical combiner module 208 illustrated in FIG. 6B is similar to the electrical combiner module 208 illustrated in FIG. 6A. However, in this embodiment, the electrical combiner modules 208 receive direct current from the AOMs 206. The direct current is combined and then provided to a unidirectional or a bidirectional AC/DC inverter 210 to convert the direct current to alternating current. The resulting alternating current can be then be provided to power a load.

FIGS. 7A-7L are block diagrams illustrating input/output modules 202 (IOM) of an electric grid parallel fuel cell electric power system (e.g., fuel cell system 100 in FIG. 1) according to embodiments of the present disclosure. Contactors and the ground may be located in the IOM 202 instead of the EDM 200 in this embodiment. For clarity and ease of explanation, the examples illustrated in FIGS. 7A-7L and described herein are described in terms of a neutral wire of an input/output module 202 (hereinafter "input/output module neutral wire") that may be electrically connected to neutral wires of an power generator power bus (hereinafter "power generator power bus neutral wire(s)"). An input/output module neutral wire may be electrically connected to the electric grid power source ground 106 via an electric grid power bus neutral wire and an electrical distribution module 200. An input/output module may be configured to convert received or input alternating current into output direct current using a unidirectional or a bidirectional AC/DC inverter 700. The input/output module may be configured to step up and/or step down the received or input alternating current and/or the output direct current using the AC/DC inverter 700. The input/output module neutral wire may electrically connect any number of local grounds 702 and any number of electrical distribution modules 200 and/or fuel cell modules 204 via any number of power generator power bus neutral wires. In some embodiments, a local ground 702 may include a ground for a site at which the fuel cell system 100 is located and/or a ground for the power generator 110. In some embodiments, any number of input/output modules 202 may connect to the same local ground 702, including the local ground 504 in FIGS. 5B-5F.

The input/output module 202 may include any number of automatic and/or controllable electrical switches 704, 710, also called automatic and/or controllable electrical contactors. For example, the input/output module 202 may include any number of circuit breakers, fuses, and/or electronic switches. The automatic and/or controllable electrical switches 704, 710 may be configured to connect and disconnect portions of the input/output module neutral wire to connect and disconnect the input/output module 202 and the electric grid power source ground 106. The automatic and/or controllable electrical switches 704, 710 may be configured to normally connect the input/output module 202 and the electric grid power source ground 106. The automatic and/or controllable electrical switches 704, 710 may be configured to disconnect the input/output module 202 and the electric grid power source ground 106 in response to any number of grid events described above. In some embodiments, a single automatic and/or controllable electrical switch 704 or 710 may connect and/or disconnect the input/output module 202 and the electric grid power source ground 106, such as the examples illustrated in FIGS. 7B, 7D, 7F, 7G, 7I, and 7K. In some embodiments, multiple automatic and/or controllable electrical switches 704, 710 may connect and/or disconnect the input/output module 202 and the electric grid power source ground 106, such as the examples illustrated in FIGS. 7H, 7J, and 7L.

In some embodiments, such as the examples illustrated in FIGS. 7G-7L, the automatic and/or controllable electrical switches 710 may be further configured to connect and disconnect portions of the input/output module neutral wire, and/or the input/output module neutral wire and any number of power generator power bus neutral wires, to connect and disconnect the input/output modules 202 and any number of local grounds 702. Grid events may cause the automatic and/or controllable electrical switches 710 to disconnect the input/output modules 202 and the electric grid power source ground 106, and connect the input/output modules 202 to the local grounds 702. In some embodiments, the automatic and/or controllable electrical switches 710 may be controllable switches such as contactors (e.g. relays) configured to operate in response to automatic switches 500 and/or 704, such as circuit breakers, disconnecting the electric grid power source ground 106. For example an electrical switch controller (not shown) may be configured to read an auxiliary contact of any of the automatic and/or controllable electrical switches 500, 704, 710 and cause any number of controllable electrical switches 710 to connect the input/output modules 202 and the local grounds 702

In some embodiments, such as the examples illustrated in FIGS. 7C-7F and 7I-7L, the electrical input/output module neutral wire may include any number of resistors 706 and/or inductors 708, which may be configured to limit the neutral fault current to any number of local grounds 702 when the input/output module 202 and the electric grid power source ground 106 are disconnected.

Figure 8:
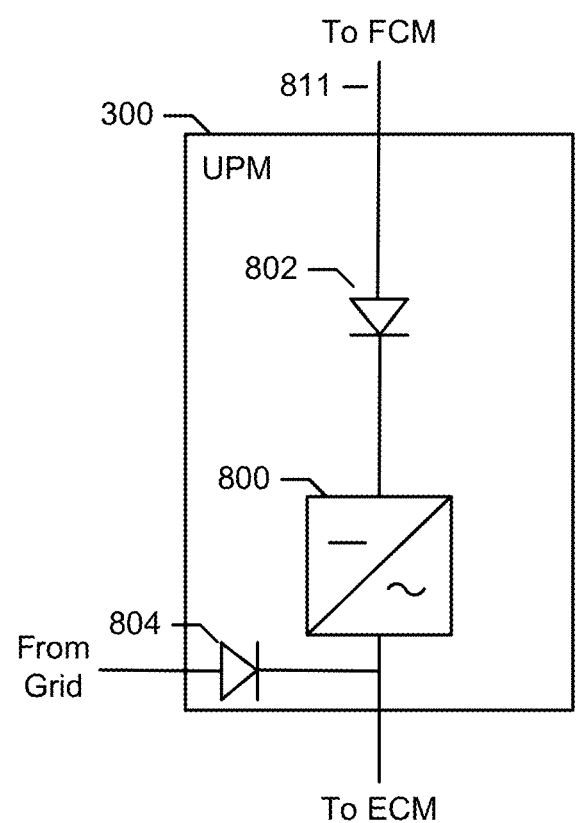
FIG. 8 is a block diagram illustrating an uninterruptable power module of an electric grid parallel fuel cell electric power system according to embodiments of the present disclosure.

FIG. 8 illustrates an example uninterruptable power module 300 (UPM) of an electric grid parallel fuel cell electric power system (e.g., fuel cell system 100 in FIG. 1) according to embodiments of the present disclosure. The UPM 300 includes at least one DC/AC inverter 800. If desired, an array of inverters may be used. Any suitable inverter known in the art may be used. The UPM 300 optionally contains an input rectifier, such as an input diode 802 which connects to the output of a DC bus 811 from the fuel cell module(s) 204 and to the input of the at least one inverter 800. The UPM 300 also optionally contains a boost PFC rectifier 804, such as a diode, which connects to the output the electric grid, such as a utility grid, and to the input of the at least one inverter 800.

Figure 9:
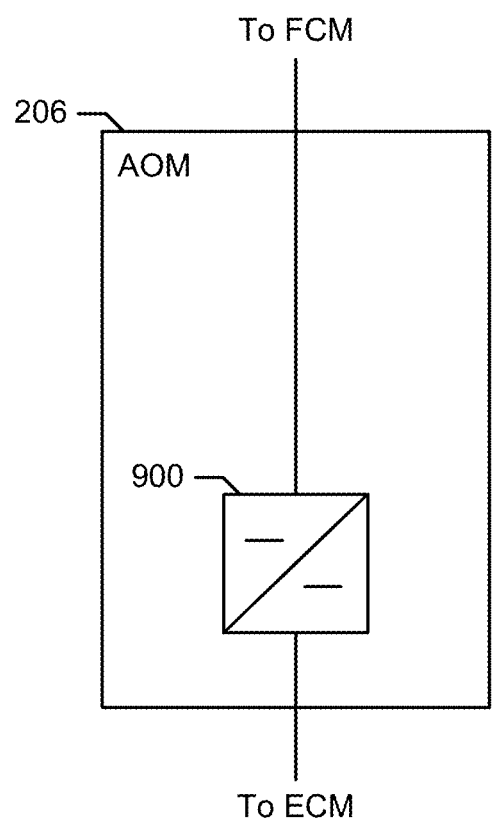
FIG. 9 is a block diagram illustrating an auxiliary output module of an electric grid parallel fuel cell electric power system according to embodiments of the present disclosure.

FIG. 9 illustrates an example auxiliary output module 206 (AOM) of an electric grid parallel fuel cell electric power system (e.g., fuel cell system 100 in FIG. 1) according to embodiments of the present disclosure. The AOM may include a unidirectional or a bidirectional DC/DC convertor 900. The unidirectional or a bidirectional DC/DC convertor 900 is used to convert the voltage of an input direct current to a desired voltage for an output direct current.

Figure 10:
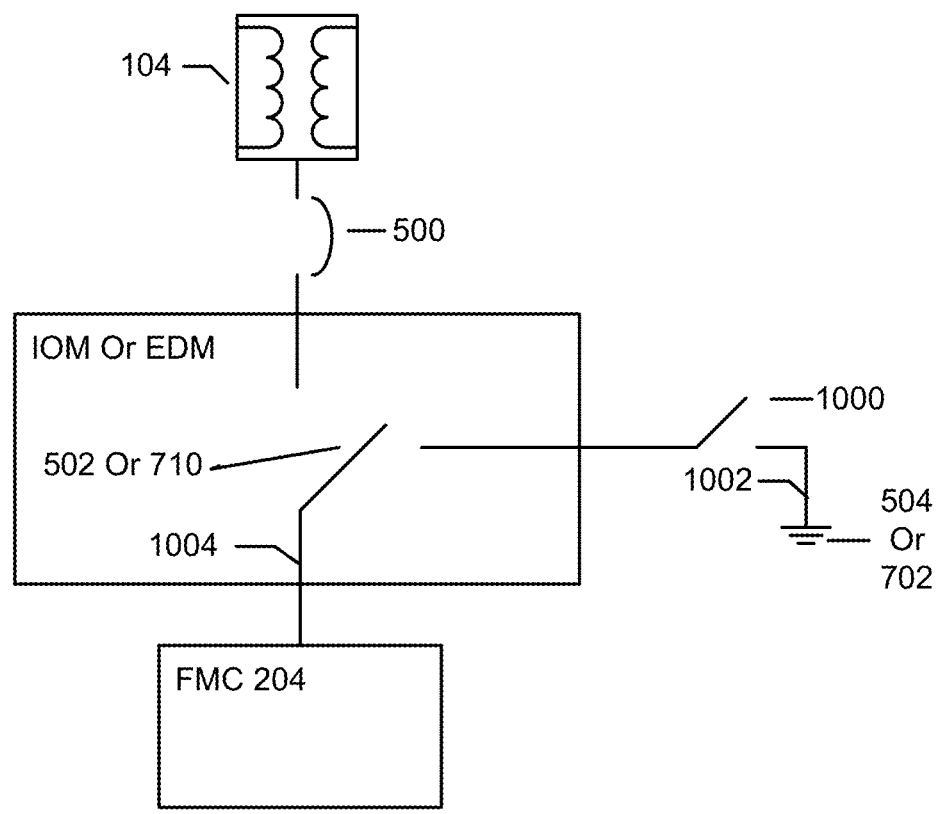
FIG. 10 is a block diagram illustrating an input/output module of an electric grid parallel fuel cell electric power system according to an embodiment of the present disclosure.
Figure 11A:
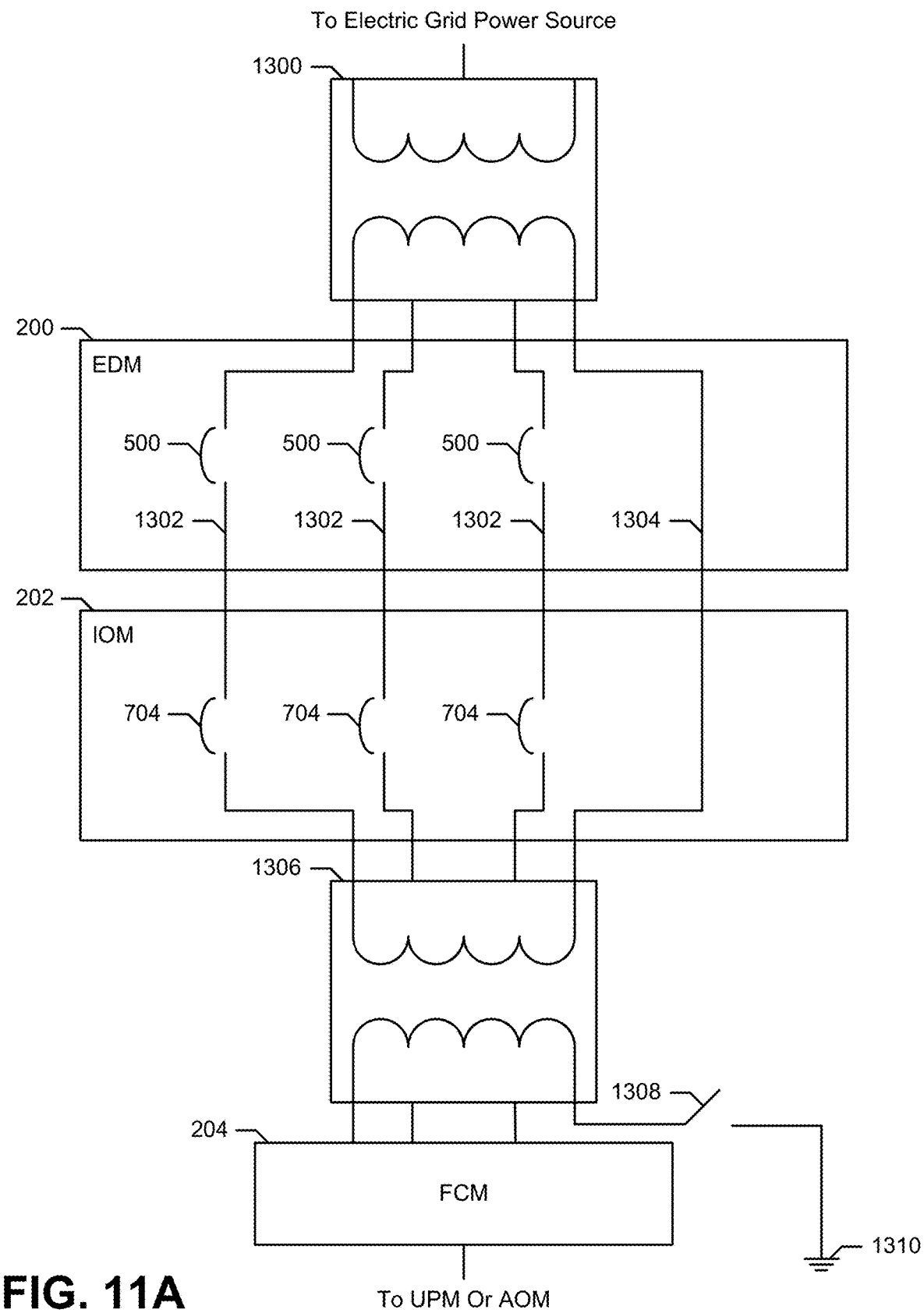
FIGS. 11A-11E are block diagram illustrating grounded transformer neutral busses of an electric grid parallel fuel cell electric power system according to embodiments of the present disclosure.
Figure 11B:
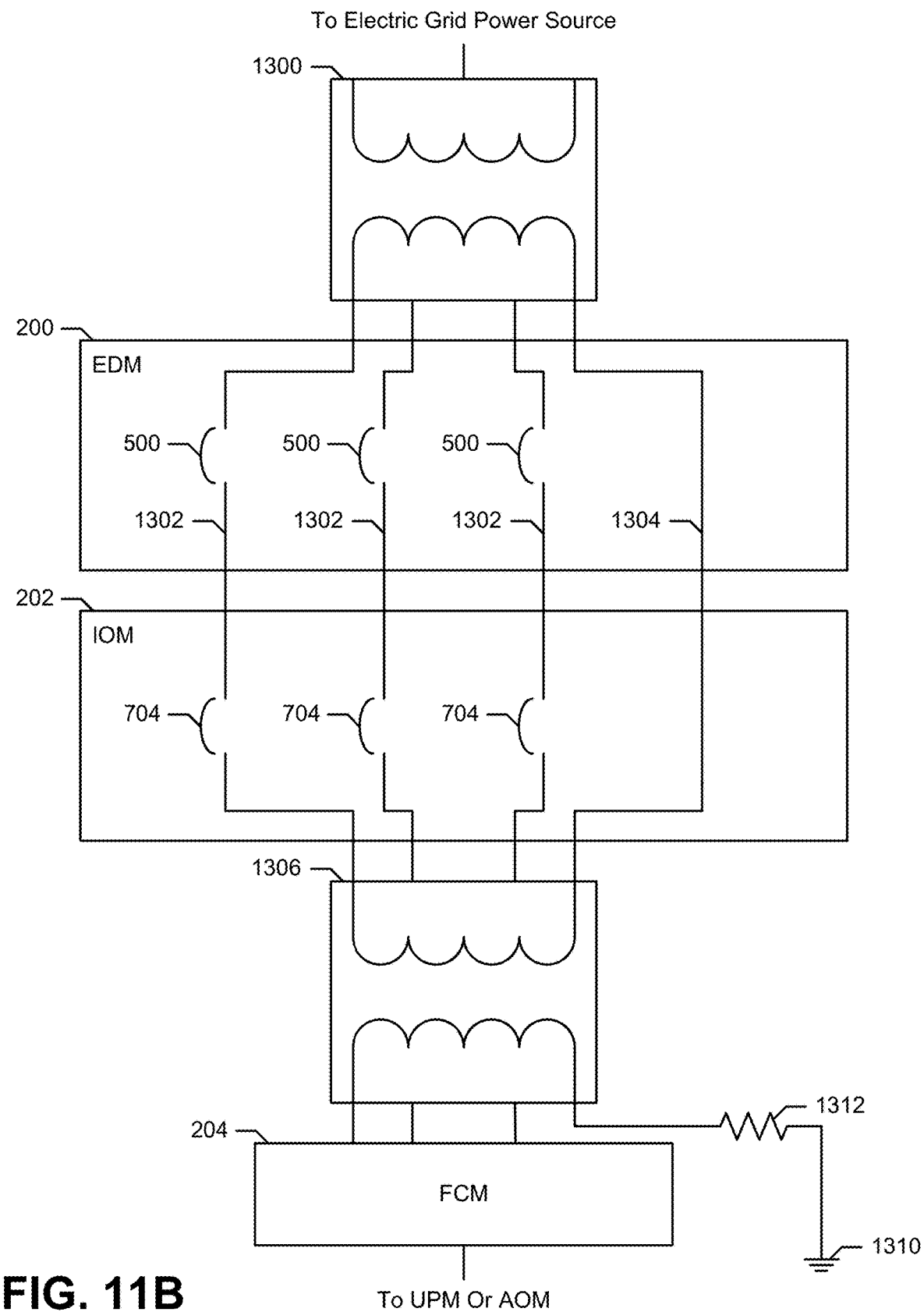
Figure 11C:
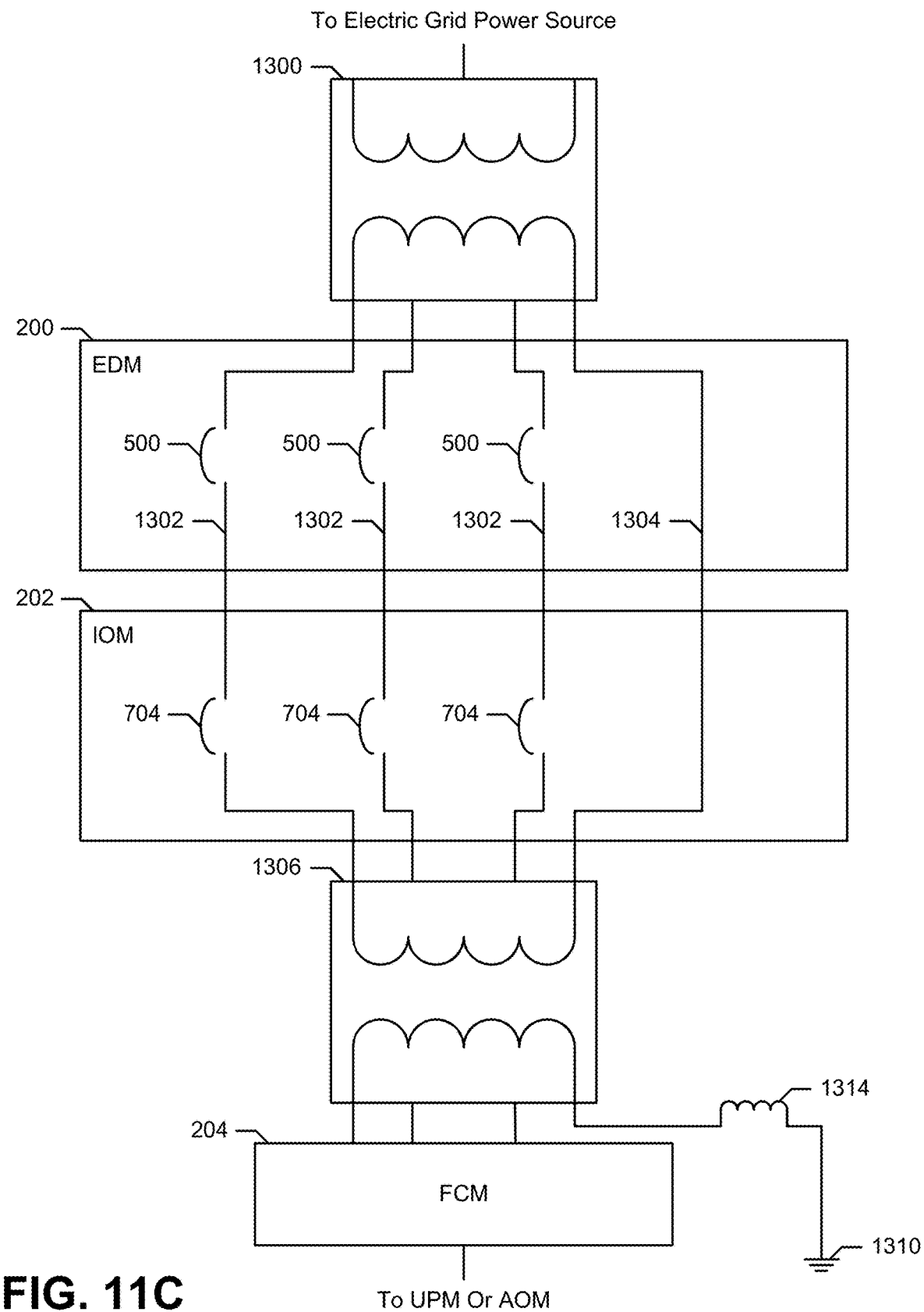
Figure 11D:
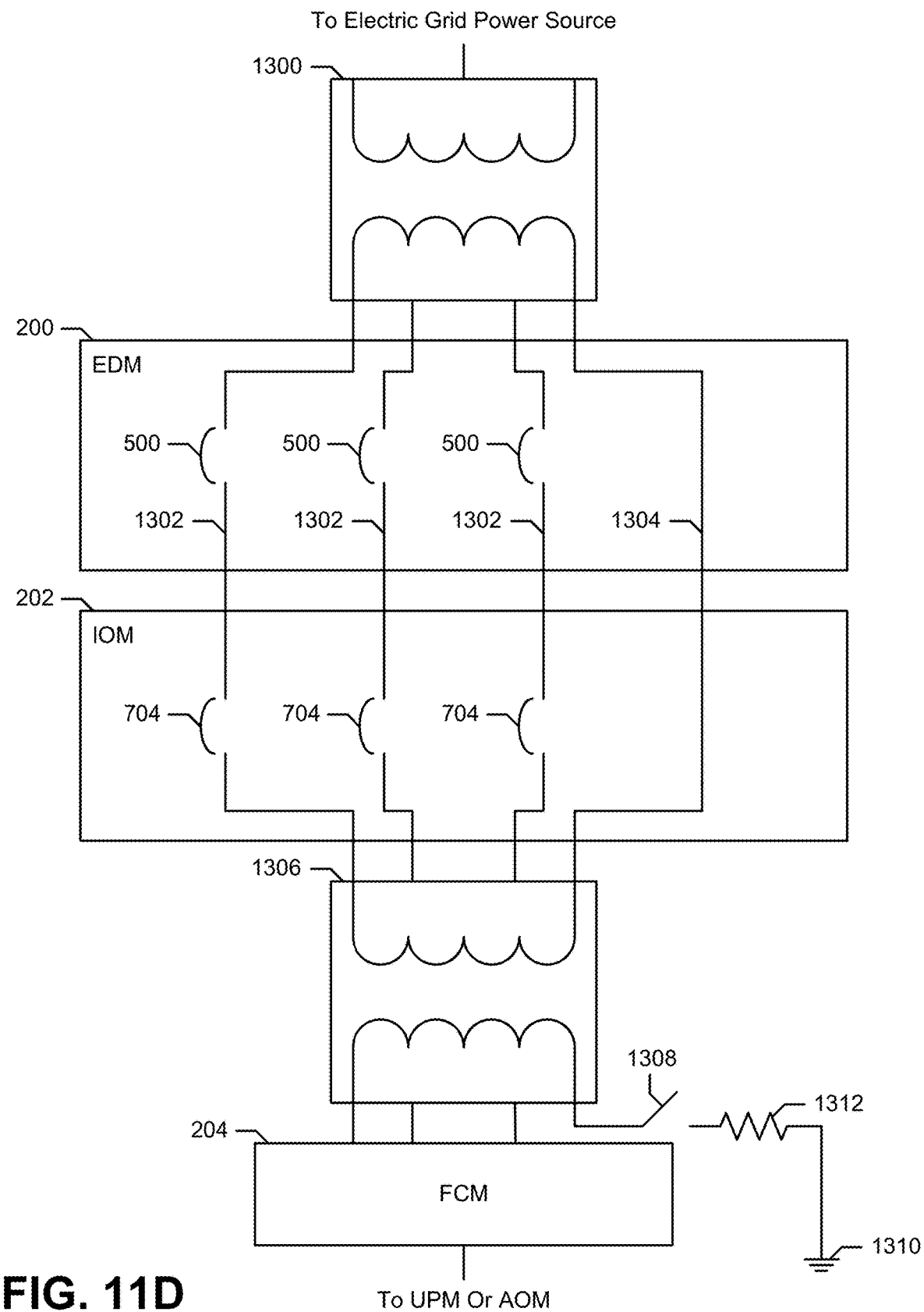
Figure 11E:
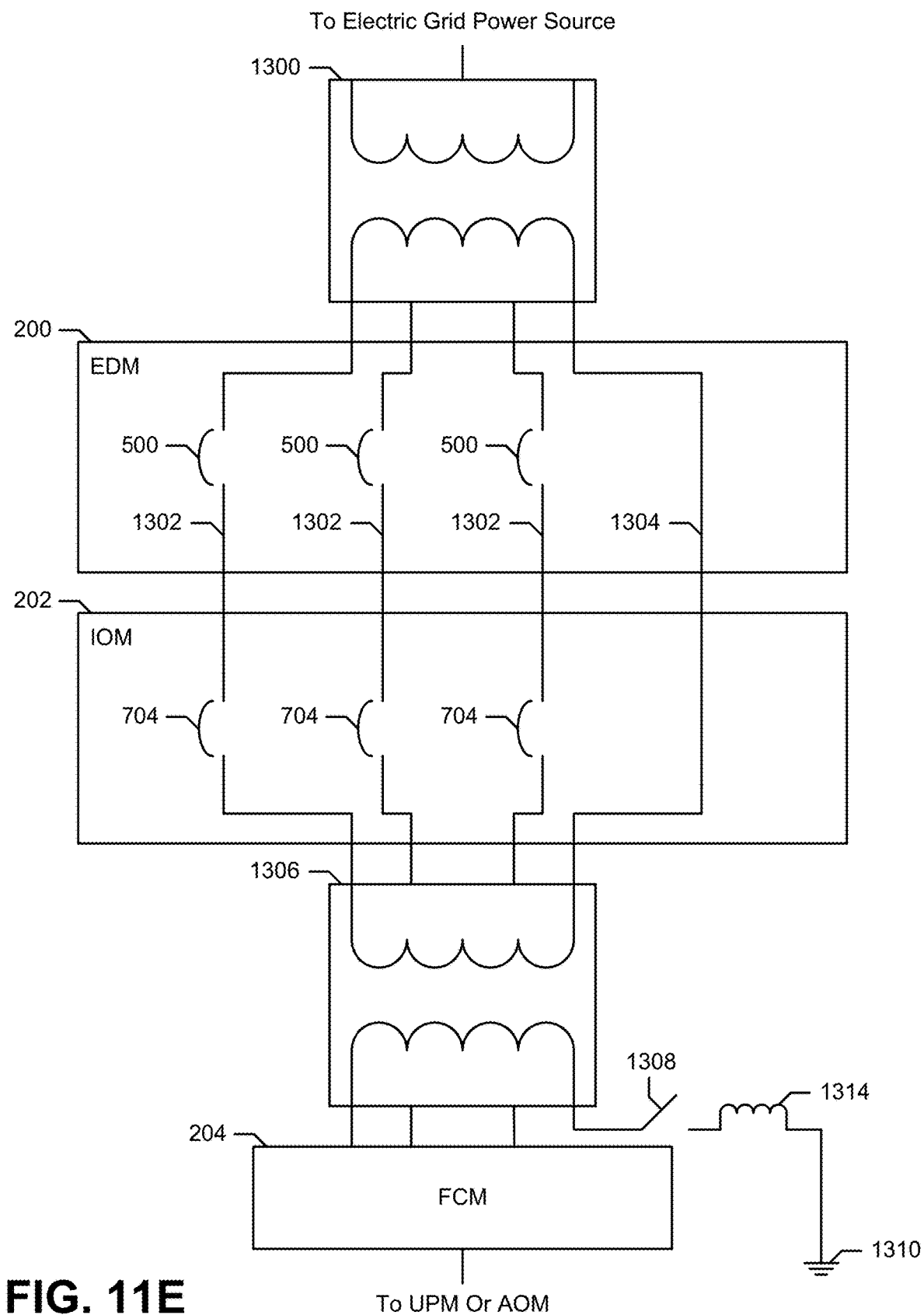

FIG. 10 illustrates an example EDM 200 or input/output module 202 (IOM) of an electric grid parallel fuel cell electric power system (e.g., fuel cell system 100 in FIG. 1) according to an embodiment of the present disclosure. The input/output module 202 is as described further herein with reference to FIGS. 7A-7L, the descriptions of which are incorporated into the example illustrated in FIG. 10. At least one additional switch 1000 may be electrically connectable between at least one of the EDM 200 and the input/output module 202 and the local ground 504 or 702, for example by portions of the power generator power bus neutral wire 1004. Examples of the automatic and/or controllable electrical switch 1000 may include any number of contactors (e.g. relays), circuit breakers, fuses, and/or solid state switches. The automatic and/or controllable electrical switch 1000 may be configured to connect and disconnect the input/output module 202 and the local ground 702. The automatic and/or controllable electrical switch 1000 may be configured to normally disconnect the at least one EDM 200 and input/output module 202 and the local ground 504, 702. The automatic and/or controllable electrical switch 1000 may be configured to connect the at least one EDM 200 and input/output module 202 and the local ground 504, 702 in response to any number of grid events.

In some embodiments, the automatic and/or controllable electrical switch 1000 may be configured to operate in response to automatic and/or controllable electrical switches 502, 704, 710 disconnecting the electric grid power source ground 106. For example, the automatic and/or controllable electrical switches 502, 704, 710 are switched to electrically disconnect at least the neutral line 1004 from a circuit breaker 500 and to electrically connect at least the neutral line to the ground (i.e. local ground 502, 702) via a ground line 1002 containing the automatic and/or controllable electrical switch 1000 in response to detecting that at least one of the electrical distribution module 200 or the plurality of input output modules 202 are electrically disconnected from the utility grid transformer 104 by the circuit breaker 500. In an embodiment, the automatic and/or controllable electrical switches 502, 704, 710 may comprise a relay containing a primary contactor, an auxiliary contactor and a detector and the detector detects that the automatic and/or controllable electrical switch 502, 704, 710 is switched to electrically disconnect at least the neutral wire 1004 from the circuit breaker 500 comprises detecting a current or voltage through the auxiliary contactor using the detector. In an embodiment, the automatic and/or controllable electrical switches 502, 704, 710 comprise a relay and detecting that the automatic and/or controllable electrical switches 502, 704, 710 are switched to electrically disconnect at least the neutral line from the circuit breaker comprises sending an electrical test signal between the electrical distribution module 200 and the plurality of input output modules 202 and detecting that the automatic and/or controllable electrical switches 502, 704, 710 are switched when the electrical test signal is disrupted. In an embodiment, the automatic and/or controllable electrical switches 502, 704, 710 comprise a relay and detecting that automatic and/or controllable electrical switches 502, 704, 710 are switched to electrically disconnect at least the neutral line from the circuit breaker comprises measuring a change in resistance between the ground line and a point in the neutral line located between the circuit breaker 500 and automatic and/or controllable electrical switches 502, 704, 710.

In an embodiment, the fuel cell power generator 110 comprises a fuel cell module 204 and an input output module 202 containing a first DC/AC inverter 700, a first electrical output of the of the fuel cell module 204 is electrically connected to the input output module 202 and the input output module 202 is electrically connected to the utility grid via a utility grid transformer 104 and a circuit breaker

500. In an embodiment, the first electrical output of the power generator 110 is automatically electrically disconnected by the circuit breaker 500 from the utility grid transformer 104 when the grid experiences a power spike or an outage and at least one switch 704, 710 is located in the input output module and is switched to electrically disconnect at least the neutral line from the circuit breaker and to electrically connect at least the neutral line to the ground 702 in response to detecting that the input output module 202 is electrically disconnected from the utility grid transformer 104 by the circuit breaker.

In an embodiment, a second electrical output of the fuel cell module 204 is electrically connected to the load via an uninterruptible power module 300 containing a second DC/AC inverter 800 or via an auxiliary output module 206 containing a DC/DC converter 900 and a DC output. In an embodiment, the fuel cell power generator 110 comprises a plurality of fuel cell modules 204, a plurality of input output modules 202 containing a respective DC/AC inverter 700, and an electrical distribution module 200, a first electrical output of the of each of the plurality of the fuel cell modules 204 is electrically connected to a respective one of the plurality of input output modules 202 and the plurality of input output modules 202 are electrically connected to the utility grid 102 via the electrical distribution module 200, a utility grid transformer 104 and a circuit breaker 500.

In an embodiment, neutral lines of the plurality of fuel cell modules 204 are electrically connected to each other in the electrical distribution module 200 to form the neutral line 1004 of the power generator 110, the first electrical output of the power generator 110 is automatically electrically disconnected by the circuit breaker 500 from the utility grid transformer 104 when the grid 102 experiences a power spike or an outage and a switch 7710 is located in each of the plurality of the input output modules 202 and is switched to electrically disconnect at least the neutral line 1004 from the circuit breaker 500 and to electrically connect at least the neutral line to the ground 702 in response to detecting that the electrical distribution module 200 is electrically disconnected from the utility grid transformer 104 by the circuit breaker.

In an embodiment, at least one first switch 502, 710 comprises a switch located in the electrical distribution module 200 or a plurality of switches located in the respective input output modules 202. The at least one first switch 502, 710 is switched to electrically disconnect at least the neutral line 1004 from the circuit breaker 500 and to electrically connect at least the neutral line 1004 to the ground 504, 702 via a ground line 1002 containing a ground line switch 1000 in response to detecting that at least one of the electrical distribution module 200 or the plurality of input output modules 202 are electrically disconnected from the utility grid transformer by the circuit breaker 500. In an embodiment, the first electrical output of the power generator 110 is connected by the at least one switch 502, 710 to the ground 504, 702 through at least one of a resistor 706 or an inductor 708.

An embodiment is drawn to a power generation system. The power generation system includes a power generator 110 having a first electrical output configured to be electrically connected to a utility grid transformer 104 and a second electrical output configured to be electrically connected to a load 114, at least one first switch 502, 710 located at least on a neutral line 1004 of the power generator and configured to disconnect the neutral line from the utility grid transformer 104, a ground line 1002 electrically connecting the power generator 110 to a local ground 504, 702 and at least one ground line switch 1000 located on the ground line 1002 and configured to connect the neutral line 1004 to the local ground 504, 702 via the ground line 1002 in response to the at least one first switch 502, 710 disconnecting the neutral line 1004 from the utility grid transformer 104.

In an embodiment, the power generator 110 comprises a fuel cell power generator comprising a plurality of fuel cell modules 204, a plurality of input outputs modules 202 containing a respective DC/AC inverter 700, and an electrical distribution module 200. A first electrical output of the of each of the plurality of the fuel cell modules 204 is electrically connected to a respective one of the plurality of input output modules 202 and the plurality of input output modules 202 are electrically connected to the electrical distribution module 200. The electrical distribution module 200 is configured to be electrically connected to the utility grid transformer 104 via a circuit breaker 500.

In an embodiment, neutral lines of the plurality of fuel cell modules 204 are electrically connected to each other in the electrical distribution module 200 to form the neutral line 1004 of the power generator 110. The first electrical output of the power generator 110 is configured to be automatically electrically disconnected by the circuit breaker 500 from the utility grid transformer 104 when the grid 102 experiences a power spike or an outage. At least one first switch 502, 710 comprises a switch 502 located in the electrical distribution module 200 or a plurality of switches 710 located in the respective input output modules 202 and the at least one first switch 502, 710 is configured to be switched to electrically disconnect at least the neutral line 1004 from the circuit breaker 500 and to electrically connect at least the neutral line 1004 to the ground 504, 702 via the ground line 1002 in response to detecting that at least one of the electrical distribution module 200 or the plurality of input output modules 202 are electrically disconnected from the utility grid transformer 104 by the circuit breaker 500.

In an embodiment, the ground line switch 1000 is configured to close from a normally open position to electrically connect at least the neutral line 1004 to the ground 504, 702 via the ground line 1002 in response to detecting that the at least one first switch 502, 710 is switched to electrically disconnect at least the neutral line 1004 from the circuit breaker 500. In an embodiment, the at least one first switch 502, 710 comprises a relay containing a primary contactor, an auxiliary contactor and a detector configured to detect that the at least one first switch 502, 710 is switched to electrically disconnect at least the neutral line 1004 from the circuit breaker 500 by detecting a current or voltage through the auxiliary contactor using the detector.

In an embodiment, the at least one first switch 502, 710 comprises a relay and the system is configured to detect that the at least one first switch 502, 710 is switched to electrically disconnect at least the neutral line 1004 from the circuit breaker 500 by sending an electrical test signal between the electrical distribution module 200 and the plurality of input output modules 202 and detecting that the at least one first switch 502, 710 is switched when the electrical test signal is disrupted. In an embodiment, the at least one first switch 502, 710 comprises a relay and the system is configured to detect that the at least one first switch 502, 710 is switched to electrically disconnect at least the neutral line 1004 from the circuit breaker 500 by measuring a change in resistance between the ground line 1002 and a point in the neutral line 1004 located between the circuit breaker 500 and the at least one switch 502, 710.

In an embodiment, the first electrical output of the power generator 110 is connected by the at least one switch 502, 710 to the ground 504, 702 through at least one of a resistor 706 or an inductor 708. In an embodiment, a second electrical output of the fuel cell module 204 is configured to be electrically connected to the load 114 via an uninterruptible power module 300 containing a second DC/AC inverter 800 or via an auxiliary output module 206 containing a DC/DC converter 900 and a DC output. In an embodiment, the first electrical output of the power generator 110 comprises a four line power bus 112 which is configured to provide a three phase alternating electric current on three of the lines and the fourth line comprises the neutral line 1004.

In an embodiment, the power generator 110 comprises a fuel cell power generator comprises a first fuel cell module 204, at least one input output module 202 containing a DC/AC inverter 700, an electrical distribution module 200, and a plurality of uninterruptable power modules 300. Each of the plurality of uninterruptable power modules 300 are operably connected to the first fuel cell module 204. The load comprises a first load and a second load. The first load and the second load are operably connected to a respective one of the plurality of uninterruptable power modules 300.

In an embodiment, the power generation system also includes one or more ground fault detection circuits configured to detect ground faults when the power generation system is disconnected from the utility grid transformer 104 and connected to ground 504, 702. The one or more ground fault detection circuits may detect ground faults using one or more ground fault detection techniques, including, but are not limited to, isolated neutral, sold grounding—unigrounding, solid grounding—multigrounding, low impedance grounding and resonant grounding. These circuits may include the use of a current polarized directional element, a negative-sequence voltage-polarized directional element, a zero-sequence voltage-polarized directional element, a high-impedance fault (HIF) detection element, a residual overcurrentl counting element and/or a sum of difference current (SDI) HIF detection element.

FIGS. 11A-11E illustrate example grounded transformer neutral busses of an electric grid parallel fuel cell electric power system (e.g., fuel cell system 100 in FIG. 1) according to embodiments of the present disclosure. As illustrated in FIGS. 11A-11E, power supplied to the grounded transformer neutral busses via the electric grid power source is supplied to a first transformer 1300. The transformers may be arranged in delta (Δ) or star (Y) (also denoted as wye in some areas). A wye system allows the use of two different voltages from all three phases, such as a 230/400 V system which provides 230 V between the neutral (centre hub) and any one of the phases, and 400 V across any two phases. The three phase current from the transformer may be provided via three standard wires 1302 and a fourth neutral wire 1304. As discussed above, within the EDM 220, the three standard wires 1302 may include automatic and/or controllable electrical switches 500. The automatic and/or controllable electrical switches 500 may be configured to connect and disconnect portions of the electrical distribution module neutral wire to connect and disconnect any number of the input/output modules 202 and the electric grid power source ground 106. The neutral wire 1304 typically does not include automatic and/or controllable electrical switches 500.

Current from the EDM 200 is provided to an IOM 202 via the three standard wires 1302 and the neutral wire 1304. As discussed above, the IOM 202 may include any number of automatic and/or controllable electrical switches 704. The automatic and/or controllable electrical switches 704 are operably coupled to the standard wires 1302. As with the EDM 200, the neutral wire 1304 typically does not include automatic and/or controllable electrical switches 704.

Current from the IOM may be provided to a second transformer 1306. The second transformer 1306 may step up or step down the voltage from the IOM 202. The current from the three standard wires 1302 are provided to the FCM 204 while the neutral wire 1308 may include one or more automatic and/or controllable electrical switches 1308, resistors 1312, inductors 1314 or combinations thereof.

Figure 12:
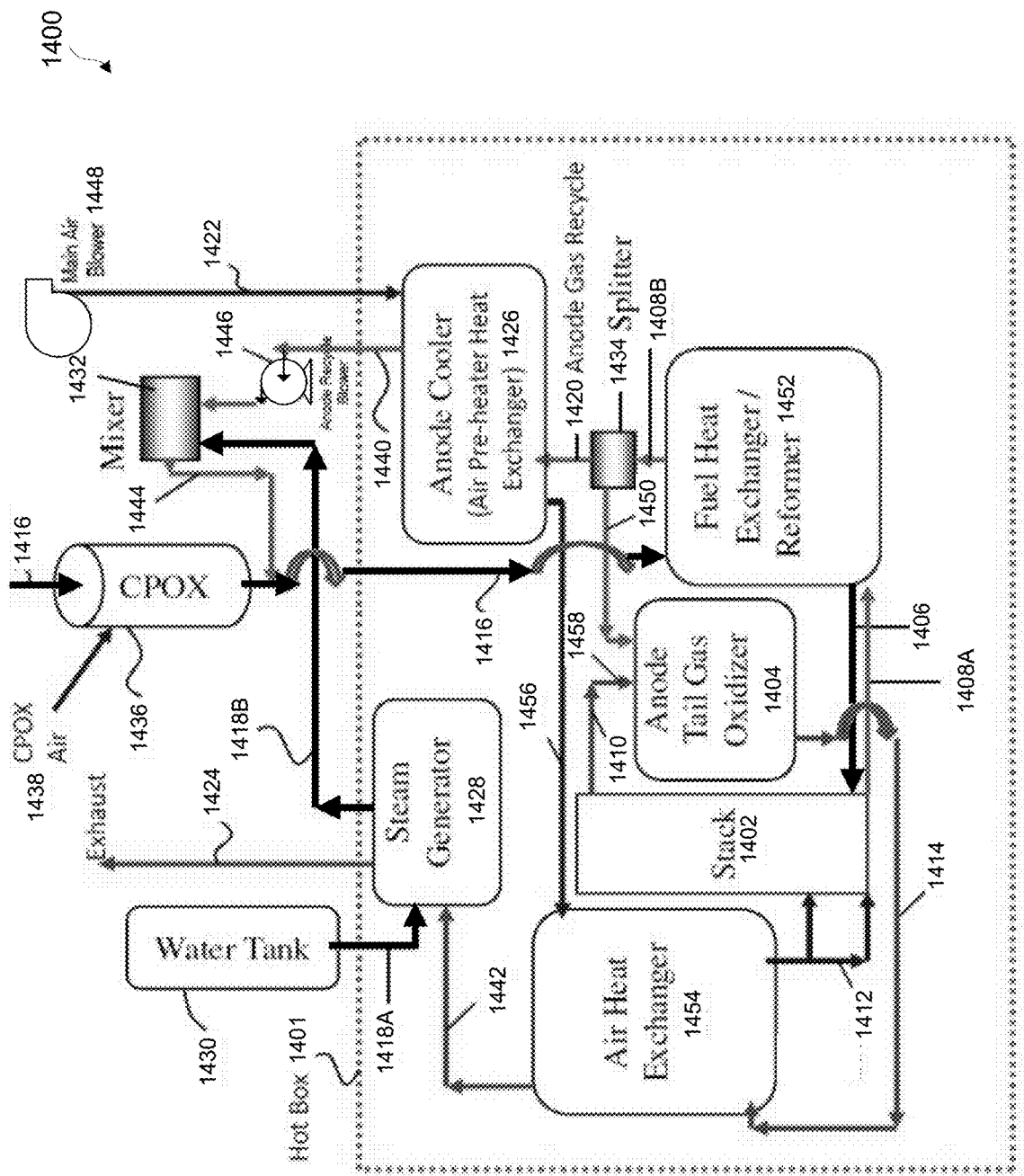
FIG. 12 is a block diagram illustrating of a fuel cell system according to an embodiment of the present disclosure.

FIG. 12 is a block diagram illustration of a fuel cell system according to an embodiment of the present disclosure. Referring to FIG. 12, a fuel cell system 1400 includes various components and flows which can be controlled according to present disclosure. Fuel cell system 1400 is also illustrated and described in U.S. application Ser. No. 14/054,010, filed Oct. 15, 2013, incorporated herein by reference. As illustrated in FIG. 12, fuel and air are supplied to a fuel cell stack 1402 housed in a hot box 1401. The hot box 1401 contains the plurality of the fuel cell stacks 1402, such as solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni—SSZ cermet, and a cathode electrode, such as lanthanum strontium manganite (LSM)). The stacks 1402 may be arranged over each other in a plurality of columns.

The hot box 1401 also contains a steam generator 1428. The steam generator 1428 is provided with water through conduit 1418A from a water source 1430, such as a water tank or a water pipe (i.e., a continuous water supply), and converts the water to steam. The steam is provided from generator 1428 to mixer 1432 through conduit 1418B and is mixed with the stack anode (fuel) recycle stream in the mixer 1432. The mixer 1432 may be located inside or outside of the hot box 1401. Preferably, the humidified anode exhaust stream is combined with the fuel inlet stream in the fuel inlet line or conduit 1416 downstream of the mixer 1432, as schematically shown in FIG. 14. Alternatively, if desired, the fuel inlet stream may also be provided directly into the mixer 1432, or the steam may be provided directly into the fuel inlet stream and/or the anode exhaust stream may be provided directly into the fuel inlet stream followed by humidification of the combined fuel streams.

The steam generator 1428 is heated by the hot anode tailgas oxidizer (ATO) 1404 exhaust stream which is passed in heat exchange relationship in conduit 1442 with the steam generator 1428.

The system operates as follows. The fuel inlet stream, such as a hydrocarbon stream, for example natural gas, is provided into the fuel inlet conduit 1416 and through a catalytic partial pressure oxidation (CPOx) reactor 1436 located outside the hot box 1401. During system start up, air is also provided into the CPOx reactor 1436 through CPOx air inlet conduit 1438 to catalytically partially oxidize the fuel inlet stream. During steady state system operation, the air flow is turned off and the CPOx reactor acts as a fuel passage way in which the fuel is not partially oxidized. Thus, the hot box 1401 may comprise only one fuel inlet conduit which provides fuel in both start-up and steady state modes through the CPOx reactor 1436. Therefore a separate fuel inlet conduit which bypasses the CPOx reactor during steady state operation is not required.

The fuel inlet stream is provided into the fuel heat exchanger (anode recuperator)/pre-reformer 1452 where its temperature is raised by heat exchange with the stack 1402 anode (fuel) exhaust stream. The fuel inlet stream is pre-reformed in the pre-reformer section of the heat exchanger 1452 via the SMR reaction and the reformed fuel inlet stream (which includes hydrogen, carbon monoxide, water vapor and unreformed methane) is provided into the stacks 1402 through the fuel inlet conduit(s) 1406. Additional reformation catalyst may be located in conduit(s) 1406. The fuel inlet stream travels upwards through the stacks through fuel inlet risers in the stacks 1402 and is oxidized in the stacks 1402 during electricity generation. The oxidized fuel (i.e., the anode or fuel exhaust stream) travels down the stacks 1402 through the fuel exhaust risers and is then exhausted from the stacks through the fuel exhaust conduit (s) 1408A into the fuel heat exchanger 1452.

In the fuel heat exchanger 1452, the anode exhaust stream heats the fuel inlet stream via heat exchange. The anode exhaust stream is then provided via the fuel exhaust conduit 1408B into a splitter 1434. A first portion of the anode exhaust stream is provided from the splitter 1434 into the ATO 1404 via conduit (e.g., slits) 1450.

A second portion of the anode exhaust stream is recycled from the splitter 1434 into the anode cooler 1426 and then into the fuel inlet stream. For example, the second portion of the anode exhaust stream is recycled through conduit 1420 into the anode cooler (i.e., air pre-heater heat exchanger) where the anode exhaust stream pre-heats the air inlet stream from conduit 1422. The anode exhaust stream is then provided by the anode recycle blower 1446 into the mixer 1432. The anode exhaust stream is humidified in the mixer 1432 by mixing with the steam provided from the steam generator 1428. The humidified anode exhaust stream is then provided from the mixer 1432 via humidified anode exhaust stream conduit 1444 into the fuel inlet conduit 1416 where it mixes with the fuel inlet stream.

The air inlet stream is provided by a main air blower 1448 from the air inlet conduit 1422 into the anode cooler heat exchanger 1426. The blower 1448 may comprise the single air flow controller for the entire system. In the anode cooler heat exchanger 1426, the air inlet stream is heated by the anode exhaust stream via heat exchange. The heated air inlet stream is then provided into the air heat exchanger (cathode recuperator 1454) via conduit 1456. The heated air inlet stream is provided from heat exchanger 1454 into the stack(s) 1402 via the air inlet conduit and/or manifold 1412.

The air passes through the stacks 1402 into the cathode exhaust conduit 1410 and through conduit 1410 and mixer 1458 into the ATO 1404. In the ATO 1404, the air exhaust stream oxidizes the split first portion of the anode exhaust stream from conduit 1450 to generate an ATO exhaust stream. The ATO exhaust stream is exhausted through the ATO exhaust conduit 1414 into the air heat exchanger 1454. The ATO exhaust stream heats air inlet stream in the air heat exchanger 1454 via heat exchange. The ATO exhaust stream (which is still above room temperature) is then provided from the air heat exchanger 1454 to the steam generator 1428 via conduit 1442. The heat from the ATO exhaust stream is used to convert the water into steam via heat exchange in the steam generator 1428. The ATO exhaust stream is then removed from the system via the exhaust conduit 1424. Thus, by controlling the air inlet blower output (i.e., power or speed), the magnitude (i.e., volume, pressure, speed, etc.) of air introduced into the system may be controlled. The cathode (air) and anode (fuel) exhaust streams are used as the respective ATO air and fuel inlet streams, thus eliminating the need for a separate ATO air and fuel inlet controllers/blowers. Furthermore, since the ATO exhaust stream is used to heat the air inlet stream, the control of the rate of single air inlet stream in conduit 1422 by blower 1448 can be used to control the temperature of the stacks 1402 and the ATO 1404.

Thus, varying the main air flow in conduit 1422 using a variable speed blower 1448 and/or a control valve may be used to maintain the stack 1402 temperature and/or ATO 1404 temperature. The main air flow rate control via blower 1448 or valve acts as a main system temperature controller. Furthermore, the ATO 1404 temperature may be controlled by varying the fuel utilization (e.g., ratio of current generated by the stack(s) 1402 to fuel inlet flow provided to the stack(s) 1402). Finally the anode recycle flow in conduits 1420 and 1440 may be controlled by a variable speed anode recycle blower 1446 and/or a control valve to control the split between the anode exhaust to the ATO 1404 and anode exhaust for anode recycle into the mixer 1432 and the fuel inlet conduit 1416.

In this embodiment, there are no external fuel and air inputs to the ATO 1404. Thus, in contrast to prior art systems, external natural gas or another external fuel is not fed to the ATO 1404. Instead, the hot fuel (anode) exhaust stream from the fuel cell stack(s) 1402 is partially recycled into the ATO as the ATO fuel inlet stream. Likewise, there is no outside air input into the ATO. Instead, the hot air (cathode) exhaust stream from the fuel cell stack(s) 1402 is provided into the ATO as the ATO air inlet stream.

Furthermore, the fuel exhaust stream is split in a splitter 1434 located in the hot box 1401. The splitter 1434 is located between the fuel exhaust outlet of the anode recuperator (e.g., fuel heat exchanger) 1452 and the fuel exhaust inlet of the anode cooler 1426 (e.g., the air pre-heater heat exchanger). Thus, the fuel exhaust stream is split between the mixer 1432 and the ATO 1404 prior to entering the anode cooler 1426. This allows higher temperature fuel exhaust stream to be provided into the ATO 1404 than in the prior art because the fuel exhaust stream has not yet exchanged heat with the air inlet stream in the anode cooler 1426. For example, the fuel exhaust stream provided into the ATO 1404 from the splitter 1434 may have a temperature of above 350 C, such as 350-500 C, for example 375 to 425 C, such as 390-410 C. Furthermore, since a smaller amount of fuel exhaust is provided into the anode cooler 1426 (e.g., not 100% of the anode exhaust is provided into the anode cooler due to the splitting of the anode exhaust in splitter 1434), the heat exchange area of the anode cooler 1426 described above may be reduced.

In an embodiment, the functions of the energy storage system, energy storage system technologies, and the energy storage system technologies management system may be implemented in software, hardware, firmware, on any combination of the foregoing. In an embodiment, the hardware may include circuitry designed for implementing the specific functions of the energy storage system, energy storage system technologies, and/or the energy storage system technologies management system. In an embodiment, the hardware may include a programmable processing device configured with instructions to implement the functions of the energy storage system, energy storage system technologies, and/or the energy storage system technologies management system.

In an embodiment, various energy storage system technologies may be housed in separate cabinets. In an embodiment, each cabinet may include a fire suppression device or system. In an embodiment, space between adjacent cabinets may be filled with a material having a high thermal mass and may be inert (e.g., alumina powder) to provide thermal insulation between the cabinets. The material may also be placed between the cabinets and a structure housing the cabinets to provide thermal insulation from the structure.

The above described methods and systems can be readily used with multiple generators in parallel with a large load, while allowing tight control of frequency and voltage.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more block/flow diagrams have been used to describe exemplary embodiments. The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The foregoing description with reference to the accompanying figures is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the foregoing description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "can have," "include", "may include", "can include", "comprise", and the like used herein indicate the existence of a corresponding feature (e.g., a number, a function, an operation, or an element) and do not exclude the existence of an additional feature.

The terms "A or B", "at least one of A and/or B", or "one or more of A and/or B" may include all possible combinations of items listed together. For example, the terms "A or B", "at least one of A and B", or "at least one of A or B" may indicate all the cases of (1) including at least one A, (2) including at least one B, and (3) including at least one A and at least one B.

The terms "first", "second", and the like used herein may modify various elements regardless of the order and/or priority thereof, and are used only for distinguishing one element from another element, without limiting the elements. For example, "a first element" and "a second element" may indicate different elements regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" as used herein may be interchangeably used with the terms, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation or a general-purpose processor (e.g., a central processing unit (CPU) or an application processor) for executing at least one software program stored in a memory device to perform a corresponding operation.

The terminology herein is only used for describing specific embodiments and is not intended to limit the scope of other embodiments. The terms of a singular form may include plural forms unless otherwise specified. The terms used herein, including technical or scientific terms, have the same meanings as understood by those of ordinary skill in the art. Terms defined in general dictionaries, among the terms used herein, may be interpreted as having meanings that are the same as, or similar to, contextual meanings defined in the related art, and should not be interpreted in an idealized or overly formal sense unless otherwise defined explicitly. Depending on the case, even the terms defined herein should not be such interpreted as to exclude various embodiments of the present disclosure.

The word "exemplary" is used herein to mean "serving as an example, instance, or illustration." Any implementation described herein as "exemplary" is not necessarily to be construed as preferred or advantageous over other implementations.

What is claimed is:

1. A power generation system, comprising: a power generator having a first electrical output configured to be electrically connected to a utility grid transformer and a second electrical output configured to be electrically connected to a load; at least one first switch located at least on a neutral line of the power generator and configured to disconnect the neutral line from the utility grid transformer; a ground line electrically connecting the power generator to a local ground; and at least one ground line switch located on the ground line and configured to connect the neutral line to the local ground via the ground line in response to the at least one first switch disconnecting the neutral line from the utility grid transformer.

2. The system of claim 1, wherein: the power generator comprises a fuel cell power generator comprising a plurality of fuel cell modules, a plurality of input output modules containing a respective DC/AC inverter, and an electrical distribution module; a first electrical output of the of each of the plurality of fuel cell modules is electrically connected to a respective one of the plurality of input output modules; the plurality of input output modules are electrically connected to the electrical distribution module; and the electrical distribution module is configured to be electrically connected to the utility grid transformer via a circuit breaker.

3. The system of claim 2, wherein: neutral lines of the plurality of fuel cell modules are electrically connected to each other in the electrical distribution module to form the neutral line of the power generator; the first electrical output of the power generator is configured to be automatically electrically disconnected by the circuit breaker from the utility grid transformer when the grid experiences a power spike or an outage; at least one first switch comprises a switch located in the electrical distribution module or a plurality of switches located in the respective input output modules; and the at least one first switch is configured to be switched to electrically disconnect at least the neutral line from the circuit breaker and to electrically connect at least the neutral line to the ground via the ground line in response to detecting that at least one of the electrical distribution module or the plurality of input output modules are electrically disconnected from the utility grid transformer by the circuit breaker.

4. The system of claim 3, wherein the ground line switch is configured to close from a normally open position to electrically connect at least the neutral line to the ground via the ground line in response to detecting that the at least one first switch is switched to electrically disconnect at least the neutral line from the circuit breaker.

5. The system of claim 4, wherein: the at least one first switch comprises a relay containing a primary contactor, an auxiliary contactor and a detector; and detecting that the at least one first switch is switched to electrically disconnect at least the neutral line from the circuit breaker comprises detecting a current or voltage through the auxiliary contactor using the detector.

6. The system of claim 4, wherein: the at least one first switch comprises a relay; and the system is configured to detect that the at least one first switch is switched to electrically disconnect at least the neutral line from the circuit breaker by sending an electrical test signal between the electrical distribution module and the plurality of input output modules and detecting that the at least one first switch is switched when the electrical test signal is disrupted.

7. The system of claim 4, wherein: the at least one first switch comprises a relay; and the system is configured to detect that the at least one first switch is switched to electrically disconnect at least the neutral line from the circuit breaker by measuring a change in resistance between the ground line and a point in the neutral line located between the circuit breaker and the at least one switch.

8. The system of claim 4, wherein the first electrical output of the power generator is connected by the at least one switch to the ground through at least one of a resistor or an inductor.

9. The system of claim 4, wherein a second electrical output of the fuel cell module is configured to be electrically connected to the load via an uninterruptible power module containing a second DC/AC inverter or via an auxiliary output module containing a DC/DC converter and a DC output.

10. The system of claim 1, wherein the first electrical output of the power generator comprises a four line power bus which is configured to provide a three phase alternating electric current on three of the lines and the fourth line comprises the neutral line.

11. The system of claim 1, wherein: the power generator comprises a fuel cell power generator comprising a first fuel cell module, at least one input output module containing a DC/AC inverter, an electrical distribution module, and a plurality of uninterruptable power modules; each of the plurality of uninterruptable power modules are operably connected to the first fuel cell module; the load comprises a first load and a second load; and the first load and the second load are operably connected to a respective one of the plurality of uninterruptable power modules.

* * * * *